_(12)_ United States Patent
Yu

(10) Patent No.: US 10,412,637 B2
(45) Date of Patent: Sep. 10, 2019

(54) HANDOVER METHOD FOR GRANT-FREE TRANSMISSION, TERMINAL DEVICE, AND NETWORK DEVICE

(71) Applicant: HUAWEI TECHNOLOGIES CO., LTD., Shenzhen, Guangdong (CN)

(72) Inventor: Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/852,903

(22) Filed: Dec. 22, 2017

(65) Prior Publication Data

US 2018/0124649 A1    May 3, 2018

Related U.S. Application Data

(63) Continuation of application No. PCT/CN2015/082036, filed on Jun. 23, 2015.

(51) Int. Cl.
*H04W 36/00* (2009.01)
*H04W 36/08* (2009.01)
(Continued)

(52) U.S. Cl.
CPC ....... *H04W 36/0005* (2013.01); *H04W 36/00* (2013.01); *H04W 36/0072* (2013.01);
(Continued)

(58) Field of Classification Search
CPC . H04W 36/0005; H04W 36/08; H04W 36/32; H04W 88/02; H04W 88/08
(Continued)

(56) References Cited

U.S. PATENT DOCUMENTS

2009/0047962 A1    2/2009    Rao
2009/0129335 A1    5/2009    Lee et al.
(Continued)

FOREIGN PATENT DOCUMENTS

CN    101272602 A    9/2008
CN    101779386 A    7/2010
(Continued)

OTHER PUBLICATIONS

International Search Report dated Mar. 11, 2016 in corresponding International Application No. PCT/CN2015/082036.
(Continued)

*Primary Examiner* — Joshua L Schwartz
(74) *Attorney, Agent, or Firm* — Staas & Halsey LLP

(57) ABSTRACT

The present disclosure provides a handover method for grant-free transmission, a terminal device, and a network device. The handover method includes: sending, by a first network device, a handover request message to a second network device to request to hand over a terminal device from the first network device to the second network device to perform grant-free transmission; receiving, by the first network device, a handover request acknowledgement message sent by the second network device to acknowledge handing over the terminal device from the first network device to the second network device to perform grant-free transmission; and sending, by the first network device, a handover instruction message to the terminal device to instruct the terminal device to transmit a signal to the second network device on a CTU resource in a grant-free transmission mode.

6 Claims, 10 Drawing Sheets

(51) Int. Cl.
*H04W 36/38* (2009.01)
*H04W 88/02* (2009.01)
*H04W 36/32* (2009.01)
*H04W 88/08* (2009.01)

(52) U.S. Cl.
CPC ........... *H04W 36/08* (2013.01); *H04W 36/32* (2013.01); *H04W 36/38* (2013.01); *H04W 88/02* (2013.01); *H04W 88/08* (2013.01)

(58) Field of Classification Search
USPC ..................................................... 455/436.1
See application file for complete search history.

(56) References Cited

U.S. PATENT DOCUMENTS

| | | | |
|---|---|---|---|
| 2013/0182680 | A1 | 7/2013 | Choi et al. |
| 2014/0254544 | A1 | 9/2014 | Kar Kin Au et al. |
| 2014/0308954 | A1 | 10/2014 | Wang et al. |
| 2015/0156686 | A1 | 6/2015 | Kikuchi |
| 2015/0334609 | A1* | 11/2015 | Waldhauser ...... H04W 36/0061 455/436 |
| 2016/0219627 | A1* | 7/2016 | Au .................... H04W 74/0841 |

FOREIGN PATENT DOCUMENTS

| | | | |
|---|---|---|---|
| CN | 102469503 A | | 5/2012 |
| CN | 103748907 A | | 4/2014 |
| CN | 104602236 A | | 5/2015 |
| JP | 2008211645 A | | 9/2008 |
| JP | 2011511482 A | | 4/2011 |
| WO | 2014013846 A1 | | 1/2014 |
| WO | 2014090200 A1 | | 6/2014 |
| WO | 2014090326 A1 | | 6/2014 |
| WO | 2014/135126 A1 | | 9/2014 |
| WO | WO 2014/135126 A1 | | 9/2014 |

OTHER PUBLICATIONS

U.S. Appl. No. 13/790,673, filed Mar. 8, 2013, Kar Kin Au et al., Huawei Technologies Co., Ltd.
Bayesteh, et al., "Blind Detection of SCMA for Uplink Grant-Free Multiple-Access," 11$^{th}$ International symposium on Wireless Communications Systems (ISWCS), IEEE, Aug. 2014, pp. 853-857.
International Search Report dated Mar. 11, 2016, in corresponding International Patent Application No. PCT/CN2015/082036, 4 pgs.
Extended European Search Report dated Apr. 30, 2018, in corresponding European Patent Application No. 15895892.6, 16 pgs.
R1-144657, Intel Corporation, "Coverage enhancement target for MTC," 3GPP TSG RAN WG1 Meeting #79, San Francisco, USA, Nov. 17-21, 2014, pp. 1-3.
Notice of Reasons for Rejection, dated Jan. 4, 2019, in Japanese Application No. 2017566738 (13 pp.).
Office Action, dated Jun. 6, 2019, in Chinese Application No. 201580080019.4 (11 pp.).
Communication pursuant to Article 94(3) EPC, dated Jun. 25, 2019, in European Application No. 15895892.6 (14 pp.).

* cited by examiner

# HANDOVER METHOD FOR GRANT-FREE TRANSMISSION, TERMINAL DEVICE, AND NETWORK DEVICE

CROSS-REFERENCE TO RELATED APPLICATIONS

This application is a continuation of International Application No. PCT/CN2015/082036, filed on Jun. 23, 2015, which is hereby incorporated by reference in its entirety.

TECHNICAL FIELD

Embodiments of the present disclosure relate to the field of communications technologies, and in particular, to a handover method for grant-free transmission, a terminal device, and a network device.

BACKGROUND

In an existing Long Term Evolution (LTE) system, when a terminal device needs to transmit uplink data, the terminal device uses an uplink scheduling request (SR) mechanism. That is, the terminal device sends an uplink scheduling request to a base station, and informs the base station that the terminal device requires an uplink resource for data transmission. After receiving the scheduling request from the terminal device, the base station allocates specific resources to the terminal device. The terminal device transmits data on the allocated resources.

Development of the Internet of Things has resulted in an increasing quantity of machine type communication (MTC) services. For an MTC service, generally, a data packet is relatively small, and a relatively low transmission delay is required. When a large quantity of MTC services exist, the foregoing scheduling request mechanism not only causes high signaling overheads but also leads to a transmission delay.

To resolve the foregoing problem, an uplink grant-free transmission technical solution has been proposed. Grant free means that, in a Public Land Mobile Network (PLMN), a terminal device does not need to use a scheduling request to request a base station to allocate a resource for data transmission. A grant free user can directly transmit a packet on a contention transmission unit (CTU) according to different characteristics, such as transmission delay or reliability requirements, of to-be-transmitted data.

However, in some scenarios, for example, when a base station (source base station) accessed currently by a terminal device carries excessively heavy load or has relatively poor channel quality, or when a terminal device enters a coverage area of a base station from a coverage area of another base station, the terminal device needs to be handed over from the source base station to another base station (target base station) to perform grant-free transmission.

Therefore, how to hand over a terminal device from a base station to another base station to perform grant-free transmission is a problem that urgently needs to be resolved.

SUMMARY

Embodiments of the present disclosure provide a handover method for grant-free transmission, a terminal device, and a network device, so that a terminal device can be handed over from a network device to another network device to perform grant-free transmission.

According to a first aspect, a handover method for grant-free transmission is provided, including: sending, by a first network device, a handover request message to a second network device, where the handover request message is used to request to hand over a terminal device from the first network device to the second network device to perform grant-free transmission; receiving, by the first network device, a handover request acknowledgement message sent by the second network device, where the handover request acknowledgement message is used to acknowledge handing over the terminal device from the first network device to the second network device to perform grant-free transmission; and sending, by the first network device, a handover instruction message to the terminal device, where the handover instruction message is used to instruct the terminal device to transmit a signal to the second network device on a contention transmission unit CTU resource in a grant-free transmission mode.

In a first possible implementation, the handover request acknowledgement message includes information about a second CTU resource that the second network device allows the terminal device to use, and the handover instruction message includes the information about the second CTU resource, so that the terminal device transmits the signal on the second CTU resource in the grant-free transmission mode.

With reference to the first possible implementation, in a second possible implementation, the handover request message includes information about a first CTU resource that is used by the terminal device for grant-free transmission before handover.

With reference to the second possible implementation, in a third possible implementation, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource.

With reference to the first possible implementation, in a fourth possible implementation, the handover request message includes information used to indicate that the terminal device supports grant-free transmission, the handover request acknowledgement message includes the information about the second CTU resource that the second network device allows the terminal device to use, and the handover instruction message includes the information about the second CTU resource that the second network device allows the terminal device to use, so that the terminal device transmits the signal on the second CTU resource in the grant-free transmission mode.

With reference to any one of the foregoing possible implementations, in a fifth possible implementation, the information about the CTU resource includes information about at least one of a time-frequency resource, a code resource, or a pilot, CTU information, or information about a contention access region.

With reference to any one of the first aspect or the foregoing possible implementations, in a sixth possible implementation, before the sending, by a first network device, a handover request message to a second network device, the method further includes: determining, by the first network device according to at least one of measurement report information of the terminal device or load information of the first network device, that the terminal device needs to be handed over to the second network device.

According to a second aspect, a handover method for grant-free transmission is provided, including: receiving, by a second network device, a handover request message sent by a first network device, where the handover request message is used to request to hand over a terminal device from the first network device to the second network device to perform grant-free transmission; determining, by the second network device, to hand over the terminal device from the first network device to the second network device to perform grant-free transmission; sending, by the second network device, a handover request acknowledgement message to the first network device, where the handover request acknowledgement message is used to acknowledge handing over the terminal device from the first network device to the second network device to perform grant-free transmission; and performing, by the second network device, blind detection on a signal that is transmitted by the terminal device on a CTU resource in a grant-free transmission mode.

In a first possible implementation, the handover request acknowledgement message includes information about a contention access region or a second CTU resource that the second network device allows the terminal device to use, so that the terminal device transmits the signal in the grant-free transmission mode according to the information about the contention access region or the second CTU resource.

With reference to the first possible implementation of the second aspect, in a second possible implementation, the handover request message includes information about a first CTU resource that is used by the terminal device for grant-free transmission before handover, and the performing, by the second network device, blind detection on a signal that is transmitted by the terminal device on a CTU resource in a grant-free transmission mode includes: performing, by the second network device based on the second CTU resource, blind detection on the signal that is transmitted by the terminal device on the second CTU resource in the grant-free transmission mode.

With reference to the second possible implementation of the second aspect, in a third possible implementation, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource.

With reference to the second or the third possible implementation of the second aspect, in a fourth possible implementation, the determining, by the second network device, to hand over the terminal device from the first network device to the second network device to perform grant-free transmission includes: determining, by the second network device according to at least one of a load status of a contention access region of the second network device, a load status of the second network device, or the first CTU resource, to hand over the terminal device to the second network device.

With reference to the first possible implementation of the second aspect, in a fifth possible implementation, the handover request message includes information used to indicate that the terminal device supports grant-free transmission, and the handover request acknowledgement message includes the information about the second CTU resource that the second network device allows the terminal device to use.

With reference to the fifth possible implementation of the second aspect, in a sixth possible implementation, the determining, by the second network device, to hand over the terminal device from the first network device to the second network device to perform grant-free transmission includes: determining, according to at least one of a load status of a contention access region of the second network device or a load status of the second network device, to hand over the terminal device to the second network device.

With reference to any one of the foregoing possible implementations of the second aspect, in a seventh possible implementation, the information about the CTU resource includes information about at least one of a time-frequency resource, a code resource, or a pilot, CTU information, or the information about the contention access region.

According to a third aspect, a handover method for grant-free transmission is provided, including: receiving, by a terminal device, a handover instruction message sent by a first network device, where the handover instruction message is used to instruct to hand over the terminal device from the first network device to a second network device to perform grant-free transmission; and transmitting, by the terminal device according to the handover instruction message, a signal to the second network device on a contention transmission unit CTU resource in a grant-free transmission mode.

In a first possible implementation of the third aspect, the terminal device performs grant-free transmission using a first CTU resource before handover, and the handover instruction message includes information about a second CTU resource that the second network device allows the terminal device to use, so that the terminal device transmits the signal on the second contention transmission unit CTU resource in the grant-free transmission mode.

With reference to the first possible implementation of the third aspect, in a second possible implementation, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource.

With reference to the first possible implementation of the third aspect, in a third possible implementation, the transmitting, by the terminal device according to the handover instruction message, a signal to the second network device on a CTU resource in a grant-free transmission mode includes: determining, by the terminal device according to the information about the second CTU resource carried in the handover instruction message, a CTU that is to be used in grant-free transmission performed after the terminal device is handed over to the second network device; and transmitting, by the terminal device, the signal on the CTU in the grant-free transmission mode.

With reference to the third possible implementation of the third aspect, in a fourth possible implementation, the second CTU resource is a contention access region, and the determining, by the terminal device according to the information about the second CTU resource carried in the handover instruction message, a CTU that is to be used in grant-free transmission performed after the terminal device is handed over to the second network device includes: determining, by the terminal device, a quantity of CTUs in the contention access region according to the information about the contention access region carried in the handover instruction message; and determining, by the terminal device, the CTU according to the following formula:

$$\text{Indx}_{CTU} = \text{Sig}_i \bmod N_{CTU},$$

where $Indx_{CTU}$ is an index number of the CTU, mod represents a modulo operation, $N_{CTU}$ represents the quantity of the CTUs in the contention access region, and $Sig_i$ represents an index of a code resource of the terminal device.

With reference to any one of first to third possible implementations of the third aspect, in a fifth possible implementation, the information about the CTU resource includes information about at least one of a time-frequency resource, a code resource, or a pilot, CTU information, or information about a contention access region.

According to a fourth aspect, a network device is provided, including: a transceiver, configured to send a handover request message to a second network device, where the handover request message is used to request to hand over a terminal device from the network device to the second network device to perform grant-free transmission; and receive a handover request acknowledgement message sent by the second network device, where the handover request acknowledgement message is used to acknowledge handing over the terminal device from the network device to the second network device to perform grant-free transmission, and send a handover instruction message to the terminal device, where the handover instruction message is used to instruct the terminal device to transmit a signal to the second network device on a contention transmission unit CTU resource in a grant-free transmission mode.

In a first possible implementation, the handover request acknowledgement message includes information about a second CTU resource that the second network device allows the terminal device to use, and the handover instruction message includes the information about the second CTU resource, so that the terminal device transmits the signal on the second CTU resource in the grant-free transmission mode.

With reference to the first possible implementation of the fourth aspect, in a second possible implementation, the handover request message includes information about a first CTU resource that is used by the terminal device for grant-free transmission before handover.

With reference to the second possible implementation of the fourth aspect, in a third possible implementation, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource.

With reference to the first possible implementation of the fourth aspect, in a fourth possible implementation, the handover request message includes information used to indicate that the terminal device supports grant-free transmission, the handover request acknowledgement message includes the information about the second CTU resource that the second network device allows the terminal device to use, and the handover instruction message includes the information about the second CTU resource that the second network device allows the terminal device to use, so that the terminal device transmits the signal on the second CTU resource in the grant-free transmission mode.

With reference to any one of the foregoing possible implementations of the fourth aspect, in a fifth possible implementation, the information about the CTU resource includes information about at least one of a time-frequency resource, a code resource, or a pilot, CTU information, or information about a contention access region.

With reference to any one of the fourth aspect or the foregoing possible implementations of the fourth aspect, in a sixth possible implementation, the network device further includes: a processor, coupled to the transceiver and configured to determine, before the network device sends the handover request message to the second network device and according to at least one of measurement report information of the terminal device or load information of the network device, that the terminal device needs to be handed over to the second network device.

According to a fifth aspect, a network device is provided, including:

a processor, configured to determine to hand over the terminal device from the first network device to the network device to perform grant-free transmission and perform blind detection on a signal that is transmitted by the terminal device on a CTU resource in a grant-free transmission mode; and a transceiver, coupled to the processor and configured to receive a handover request message sent by a first network device, where the handover request message is used to request to hand over a terminal device from the first network device to the network device to perform grant-free transmission; and send a handover request acknowledgement message to the first network device, where the handover request acknowledgement message is used to acknowledge handing over the terminal device from the first network device to the network device to perform grant-free transmission; and a detection module, configured to.

In a first possible implementation, the handover request acknowledgement message includes information about a contention access region or a second CTU resource that the network device allows the terminal device to use, so that the terminal device transmits the signal in the grant-free transmission mode according to the information about the contention access region or the second CTU resource.

With reference to the first possible implementation of the fifth aspect, in a second possible implementation, the handover request message includes information about a first CTU resource that is used by the terminal device for grant-free transmission before handover, and the processor performs, based on the second CTU resource, blind detection on the signal that is transmitted by the terminal device on the second CTU resource in the grant-free transmission mode.

With reference to the second possible implementation of the fifth aspect, in a third possible implementation, the second CTU resource is the same as the first CTU resource if the network device allows the terminal device to perform grant-free transmission using the first CTU resource; or the second CTU resource is different from the first CTU resource if the network device forbids the terminal device to perform grant-free transmission using the first CTU resource.

With reference to the second or the third possible implementation of the fifth aspect, in a fourth possible implementation, the processor determines, according to at least one of a load status of a contention access region of the network device, a load status of the network device, or the first CTU resource, to hand over the terminal device to the network device.

With reference to the first possible implementation of the fifth aspect, in a fifth possible implementation, the handover request message includes information used to indicate that the terminal device supports grant-free transmission, and the handover request acknowledgement message includes the information about the second CTU resource that the network device allows the terminal device to use.

With reference to the fifth possible implementation of the fifth aspect, in a sixth possible implementation, the processor determines, according to at least one of a load status of a contention access region of the network device or a load status of the network device, to hand over the terminal device to the network device.

With reference to any one of the foregoing possible implementations of the fifth aspect, in a seventh possible implementation, the information about the CTU resource includes information about at least one of a time-frequency resource, a code resource, or a pilot, CTU information, or the information about the contention access region.

According to a sixth aspect, a terminal device is provided, including: a transceiver, configured to receive a handover instruction message sent by a first network device, where the handover instruction message is used to instruct to hand over the terminal device from the first network device to a second network device to perform grant-free transmission; and transmit, according to the handover instruction message, a signal to the second network device on a contention transmission unit CTU resource in a grant-free transmission mode.

In a first possible implementation of the sixth aspect, in a seventh possible implementation, the terminal device performs grant-free transmission using a first CTU resource before handover, and the handover instruction message includes information about a second CTU resource that the second network device allows the terminal device to use, so that the terminal device transmits the signal on the second contention transmission unit CTU resource in the grant-free transmission mode.

With reference to the first possible implementation of the sixth aspect, in a second possible implementation, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource.

With reference to the first possible implementation of the sixth aspect, in a third possible implementation, the terminal device according to the sixth aspect further includes a processor, coupled to the transceiver and configured to determine, according to the information about the second CTU resource carried in the handover instruction message, a CTU that is to be used in grant-free transmission performed after the terminal device is handed over to the second network device, where the sending module transmits the signal on the CTU in the grant-free transmission mode.

With reference to the third possible implementation of the sixth aspect, in a fourth possible implementation, the second CTU resource is a contention access region, and the processor determines a quantity of CTUs in the contention access region according to the information about the contention access region carried in the handover instruction message; and the terminal device determines the CTU according to the following formula:

$$\text{Indx}_{CTU} = \text{Sig}_i \bmod N_{CTU},$$

where $\text{Indx}_{CTU}$ is an index number of the CTU, mod represents a modulo operation, $N_{CTU}$ represents the quantity of the CTUs in the contention access region, and $\text{Sig}_i$ represents an index of a code resource of the terminal device.

With reference to any one of the foregoing possible implementations of the sixth aspect, in a fifth possible implementation, the information about the CTU resource includes information about at least one of a time-frequency resource, a code resource, or a pilot, CTU information, or the information about the contention access region.

Based on the technical solutions in the present disclosure, a first network device requests, to a second network device, to hand over a terminal device from the first network device to the second network device to perform grant-free transmission, and instructs, after the second network device allows the handover, the terminal device to transmit a signal to the second network device on a CTU in a grant-free transmission mode. In this way, a terminal device is handed over from a network device to another network device to perform grant-free transmission.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
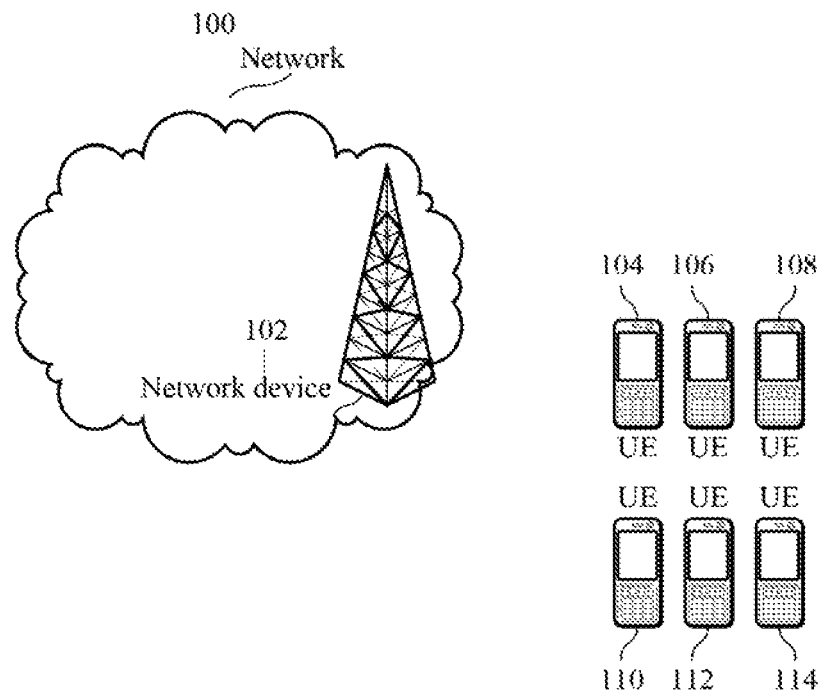
FIG. 1 is a schematic architecture diagram of a communications system to which an embodiment of the present disclosure is applied.

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions in the present disclosure may be applied to various communications systems, for example, a Global System for Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a long term evolution Advanced (LTE-A) system, and a Universal Mobile Telecommunications System (UMTS). This is not limited in the embodiments of the present disclosure. However, for convenience of description, the embodiments of the present disclosure are described using an LTE network as an example.

The embodiments of the present disclosure may be applied to radio networks of different standards. Radio access networks in different systems may include different network elements. For example, network elements of a radio access network in LTE or LTE-A include an evolved NodeB (eNB), and network elements of a radio access network in WCDMA include a radio network controller (RNC) and a NodeB. Similarly, solutions similar to those in the embodiments of the present disclosure may also be used in another radio network such as Worldwide Interoperability for Microwave Access (WiMAX), and only a related module in a base station system may be different. This is not limited in the embodiments of the present disclosure. However, for convenience of description, the following embodiments are described using an eNodeB as an example.

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

Terms such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, a thread of execution, a program, and/or a computer. As shown in figures, both an application that runs on a computing device and a computing device may be components. One or more components may reside within a process and/or a thread of execution, and a component may be located on one computer and/or distributed between two or more computers. In addition, these components may be executed from various computer readable media that store various data structures. The components may communicate using a local and/or remote process and according to, for example, a signal having one or more data packets (for example, data from a component interacting with another component in a local system, a distributed system, and/or across a network, such as the Internet interacting with another system using the signal).

It should be understood that the technical solutions in the embodiments of the present disclosure may be applied to various communications systems, for example, a GSM system, a CDMA system, a WCDMA system, an LTE system, an LTE frequency division duplex (FDD) system, an LTE time division duplex (TDD) system, a UMTS, and a future 5G communications system.

The present disclosure describes the embodiments with reference to a terminal device. The terminal device may also be user equipment (UE), an access terminal, a subscriber unit, a subscriber station, a mobile station, a mobile terminal, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device with a wireless communication function, a computing device, another processing device connected to a wireless modem, an in-vehicle device, a wearable device, a terminal device in a future 5G network, a terminal device in a future evolved PLMN network, or the like.

The present disclosure describes the embodiments with reference to a network device. The network device may be a device configured to communicate with a terminal device. For example, the network device may be a base transceiver station (BTS) in a GSM system or in CDMA, may be a NodeB (NB) in a WCDMA system, or may be an eNB in an LTE system. Alternatively, the network device may be a relay station, an access point, an in-vehicle device, a wearable device, a network-side device in a future 5G network, a network device in a future evolved PLMN network, or the like.

In addition, aspects or features of the present disclosure may be implemented as a method, an apparatus, or a product that uses standard programming and/or engineering technologies. The term "product" used in this application covers a computer program that can be accessed from any computer readable component, carrier, or medium. For example, the computer readable medium may include but is not limited to: a magnetic storage device (for example, a hard disk, a floppy disk, or magnetic tape), an optical disc (for example, a compact disc (CD) or a Digital Versatile Disc (DVD)), a smart card, and a flash memory device (for example, an erasable programmable read only memory (EPROM), a card, a stick, or a key drive). In addition, various storage media described in this specification may indicate one or more devices and/or other machine-readable media configured to store information. The term "machine-readable media" may include but is not limited to a radio channel, and various other media that can store, contain, and/or bear an instruction and/or data.

In an existing cellular communications system, such as a GSM system, a WCDMA system, or an LTE system, mainly voice and data communication are supported. Generally, a quantity of connections supported by a conventional base station is limited and is easy to implement.

A next-generation mobile communications system not only supports conventional communication but also supports Machine to Machine (M2M) communication which is also referred to as MTC. It is predicted that, in 2020, there will be 50 billion to 100 billion MTC devices connected over a network. This greatly exceeds a current quantity of connections. For M2M, because of its diversified types of services, requirements for networks are greatly different. Roughly, there may exist the following several requirements: reliable transmission, but insensitive to a delay; and a low delay, and highly reliable transmission. A service that requires reliable transmission but is insensitive to a delay is relatively easy to handle. However, for a service that requires a low delay and highly reliable transmission, such as a Vehicle to Vehicle (V2V) service, it is required that a transmission delay should be low and transmission should be reliable. If transmission is unreliable, retransmission is caused. As a result, the transmission delay is excessively high, and requirements cannot be met.

Existence of a large quantity of connections makes a future wireless communications system differ greatly from an existing communications system. A large quantity of connections need to consume more resources for terminal device access and for scheduling signaling transmission that is related to data transmission by a terminal device.

FIG. 1 provides a simplified schematic network diagram. In a network 100, there is, for example, a network device 102. The network device 102 is connected to terminal devices 104 to 114 (referred to as UE for short in the figure) in a wireless manner, a wired manner, or another manner.

A network in this patent may be a PLMN, a D2D network, an M2M network, or another network. FIG. 1 is merely a simplified schematic diagram used as an example. A network may further include another network device, which is not shown in FIG. 1.

A terminal device in this patent application may also be UE, an access terminal, a subscriber unit, a subscriber station, a mobile station, a mobile terminal, a remote station, a remote terminal, a mobile device, a user terminal, a terminal, a wireless communications device, a user agent, or a user apparatus. The access terminal may be a cellular phone, a cordless phone, an SIP phone, a WLLstation, a PDA, a handheld device with a wireless communication function, a computing device, another processing device connected to a wireless modem, an in-vehicle device, a wearable device, a terminal device in a future 5G network, a terminal device in a future evolved PLMN network, or the like.

A network device in this patent application may be a device configured to communicate with a terminal device. The network device may be a BTS in GSM or CDMA, may be a NB in WCDMA, may be a wireless controller in a cloud radio access network (CRAN) scenario, or may be an eNB or eNodeB in LTE, an access point, an in-vehicle device, a wearable device, a network-side device in a future 5G network, a network device in a future evolved PLMN network, or the like.

To deal with a large quantity of MTC services in a future network and satisfy low-delay and high-reliability service transmission, this patent proposes a grant-free transmission solution. Grant-free transmission may be represented as grant free in English. Herein, grant-free transmission may be for uplink data transmission. Grant-free transmission may be understood as any one or more of the following meanings, or as a combination of some technical features in more than one of the following meanings:

Grant-free transmission may mean: a network device preallocates multiple transmission resources to a terminal device and informs the terminal device of the multiple transmission resources; when the terminal device has an uplink data transmission requirement, the terminal device selects at least one transmission resource from the multiple transmission resources preallocated by the network device, and sends uplink data using the selected transmission resource; the network device detects, on one or more of the preallocated multiple transmission resources, the uplink data sent by the terminal device. The detection may be blind detection, may be detection performed according to a control domain in the uplink data, or may be detection performed in another manner.

Grant-free transmission may mean: a network device preallocates multiple transmission resources to a terminal device and informs the terminal device of the multiple transmission resources, so that when the terminal device has an uplink data transmission requirement, the terminal device selects at least one transmission resource from the multiple transmission resources preallocated by the network device and sends uplink data using the selected transmission resource.

Grant-free transmission may mean: information about preallocated multiple transmission resources is obtained; when there is an uplink data transmission requirement, at least one transmission resource is selected from the multiple transmission resources, and uplink data is sent using the selected transmission resource. An obtaining manner may be obtaining the information about the preallocated multiple transmission resources from a network device.

Grant-free transmission may mean: a method for implementing uplink data transmission of a terminal device without dynamic scheduling performed by a network device. The dynamic scheduling may be a scheduling manner in which the network device indicates, using signaling, a transmission resource for each uplink data transmission of the terminal device. Optionally, implementing uplink data transmission of a terminal device may be understood as follows: Two or more terminal devices are allowed to perform uplink data transmission on a same time-frequency resource. Optionally, the transmission resource may be a transmission resource in one or more transmission time units following a time point at which the UE receives the signaling. One transmission time unit may be a minimum time unit of one transmission, for example, a Transmission Time Interval (TTI), and its value may be 1 ms. Alternatively, one transmission time unit may be a preset transmission time unit.

Grant-free transmission may mean: a terminal device performs uplink data transmission without being granted by a network device. The grant may mean: A terminal device sends an uplink scheduling request to a network device; after receiving the scheduling request, the network device sends an uplink grant to the terminal device, where the uplink grant indicates an uplink transmission resource allocated to the terminal device.

Grant-free transmission may mean a contention-based transmission mode, and may mean: Multiple terminals simultaneously perform uplink data transmission on a same preallocated time-frequency resource without being granted by a base station.

The data may include service data or signaling data.

The blind detection may be understood as detection performed, when it is unknown in advance whether data arrives, on data that may arrive. The blind detection may also be understood as detection performed without explicit signaling indication.

The transmission resource may include but is not limited to one of the following resources or a combination of more than one of the following resources: a time domain resource, such as a radio frame, a subframe, and a symbol; a frequency domain resource, such as a subcarrier and a resource block;

a space domain resource, such as a transmit antenna and a beam; a code domain resource, such as a sparse code multiple access (SCMA) codebook set, a Low Density Signature (LDS) group, and a CDMA code group; or an uplink pilot resource.

The foregoing transmission resource may be used for transmission performed according to a control mechanism including but not limited to the following: uplink power control, such as control of an upper limit of uplink transmit power; modulation and coding scheme setting, such as transport block size setting, code rate setting, or modulation order setting; and a retransmission mechanism, such as a HARQ mechanism.

A contention transmission unit (CTU) may be a basic transmission resource for grant-free transmission. The CTU may be a transmission resource with a combination of a time, frequency, and code domain resource, may be a transmission resource with a combination of a time, frequency, and pilot resource, or may be a transmission resource with a combination of a time, frequency, code domain, and pilot resource.

A CTU access region may be a time-frequency resource region used for grant-free transmission.

US patent application publication number US20140254544 (and corresponding PCT/CN2014/073084 and entitled "System and Method for Uplink Grant-Free Transmission Scheme" provides a technical solution of uplink grant-free transmission. The application US20140254544 and PCT/CN2014/073084 describe that a radio resource may be divided into various CTUs and that UE data is mapped to a CTU. One code group may be allocated to each CTU. The allocated code group may be a group of CDMA codes, or may be an SCMA codebook set, an LDS group, a signature group, or the like. Each code may be corresponding to one pilot group. A user may select one code and one pilot in a pilot group corresponding to the code, to perform uplink transmission. Content of US patent application publication number US20140254544 and of PCT/CN2014/073084 may also be understood as a part incorporated into content of the embodiments of the present disclosure by reference, and details are not described.

Figure 2:
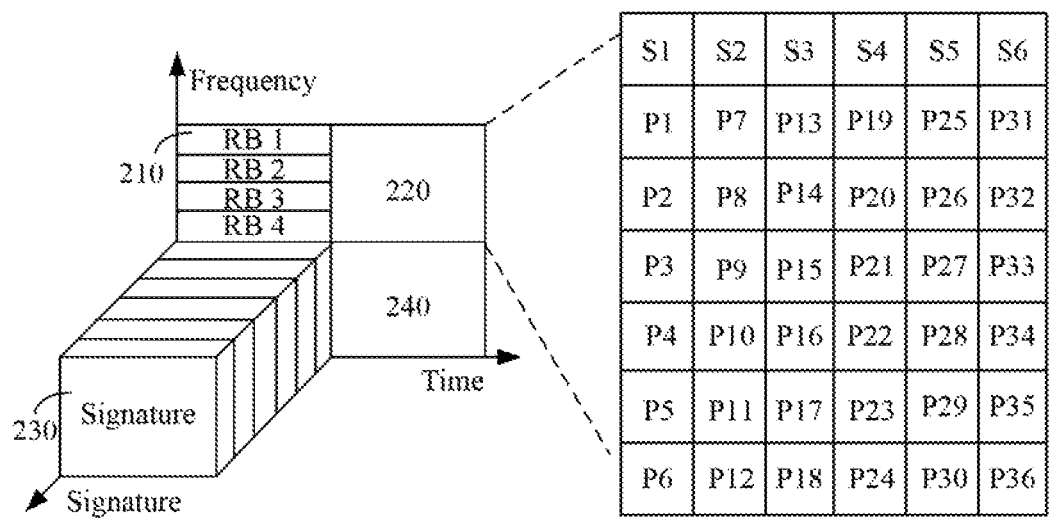
FIG. 2 is a schematic diagram of a CTU resource definition according to an embodiment of the present disclosure.

FIG. 2 is a schematic diagram of a CTU resource definition according to an embodiment of the present disclosure.

FIG. 2 shows four contention access regions (also referred to as CTU access regions) 210, 220, 230, and 240. Available bandwidth is divided into time-frequency resource regions of the four contention access regions. Each contention access region may occupy a preset quantity of resource blocks (RB). For example, in the embodiment in FIG. 2, the contention access region 210 includes four RBs: an RB 1, an RB 2, an RB 3, and an RB 4. This embodiment of the present disclosure is not limited thereto. For example, different contention access regions may include different quantities of RBs. In FIG. 2, each contention access region can support 36 UEs contending for 36 CTUs defined in the contention access region. Each CTU is a combination of a time resource, a frequency resource, a code resource, and a pilot. The code resource includes a CDMA code, an SCMA code, an LDS, another signature, or the like. Each contention access region occupies one time-frequency resource region. Each time-frequency resource region supports six signatures (S1 to S6), and each signature is mapped to six pilots, thereby generating a total of 36 pilots (P1 to P36). A base station can detect or decode, using a pilot/signature decorrelator, a signal sent by each UE on a CTU.

It should be understood that, for convenience of description, FIG. 2 shows four contention access regions. This embodiment of the present disclosure is not limited thereto. More or fewer contention access regions may be defined according to a need.

Figure 3:
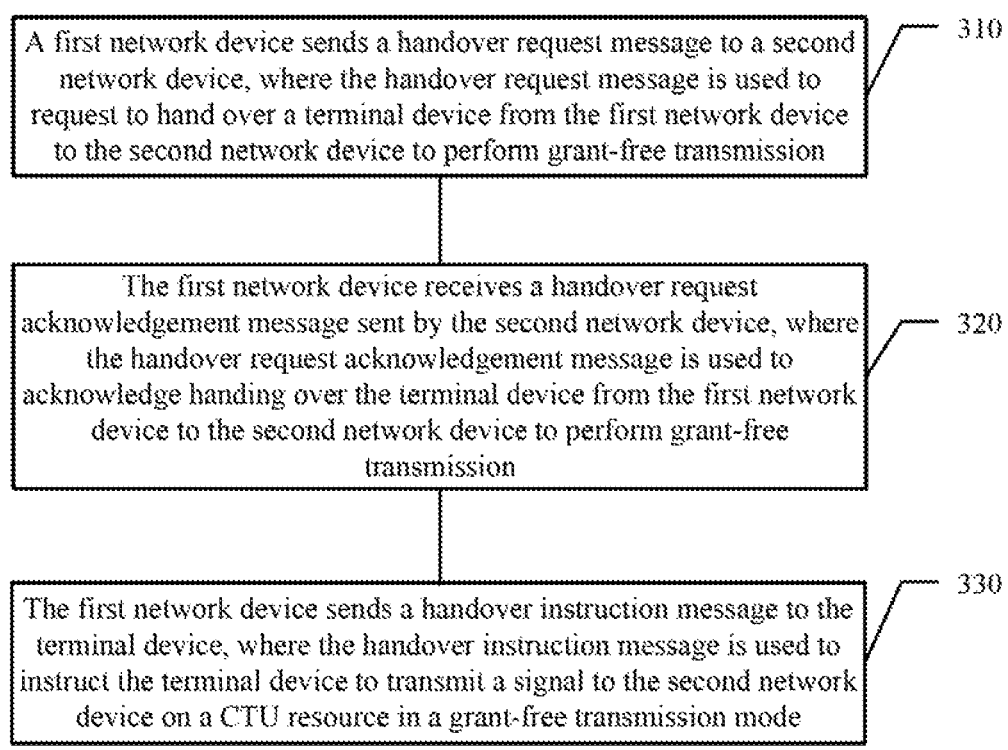
FIG. 3 is a schematic flowchart of a handover method for grant-free transmission according to an embodiment of the present disclosure.

FIG. 3 is a schematic flowchart of a handover method for grant-free transmission according to an embodiment of the present disclosure. The method in FIG. 3 is executed by the network device (for example, a base station) in FIG. 1.

310: A first network device sends a handover request message to a second network device, where the handover request message is used to request to hand over a terminal device from the first network device to the second network device to perform grant-free transmission.

320: The first network device receives a handover request acknowledgement message sent by the second network device, where the handover request acknowledgement message is used to acknowledge handing over the terminal device from the first network device to the second network device to perform grant-free transmission.

330: The first network device sends a handover instruction message to the terminal device, where the handover instruction message is used to instruct the terminal device to transmit a signal to the second network device on a CTU resource in a grant-free transmission mode.

Specifically, the first network device is a source network device, and the second network device is a target network device. Before handover, the terminal device communicates with the first network device in the grant-free transmission mode. After handover, the terminal device communicates with the second network device in the grant-free transmission mode. When a handover condition is met (for example, quality of a channel between the terminal device and the second network device is better than quality of a channel between the terminal device and the first network device, or the terminal device enters a coverage area of the second network device from a coverage area of the first network device), the first network device initiates, to the second network device, handover process using the handover request message. After receiving the handover request message, the second network device sends the handover request acknowledgement message to the first network device when the second network device determines to allow the terminal device to access the second network device in the grant-free transmission mode. When the first network device determines, according to the handover request acknowledgement message, that the second network device allows the handover, the first network device sends the handover instruction message to the terminal device. The terminal device transmits, according to the handover request instruction message, the signal to the second network device on the CTU resource in the grant-free transmission mode.

The CTU resource may be a contention access region used for grant-free transmission, or may be a CTU included in a contention access region. This embodiment of the present disclosure is not limited thereto. Alternatively, the CTU resource may be at least one of a time-frequency resource, a code resource, or a pilot included in a CTU. For example, a time domain resource may be a radio frame, a subframe, a symbol, or the like; a frequency domain resource may be a subcarrier, a resource block, or the like; a code domain resource may be an SCMA codebook, an LDS, a CDMA code, or the like.

According to this embodiment of the present disclosure, a first network device requests, to a second network device, to hand over a terminal device from the first network device to the second network device to perform grant-free transmission, and instructs, after the second network device allows the handover, the terminal device to transmit a signal to the second network device on a CTU in a grant-free transmission mode. In this way, a terminal device is handed over from a network device to another network device to perform grant-free transmission.

According to this embodiment of the present disclosure, the handover request acknowledgement message includes information about a second CTU resource that the second network device allows the terminal device to use, and the handover instruction message includes the information about the second CTU resource, so that the terminal device transmits the signal on the second CTU resource in the grant-free transmission mode.

Specifically, the handover request acknowledgement message and the handover instruction message carry the information about the CTU resource that the second network device allows the terminal device to use for grant-free transmission, so that the terminal device determines a CTU according to the information about the CTU resource, to perform grant-free transmission. Because the second network device can know in advance the CTU resource used by the terminal device for accessing the second network device, the second network device can quickly demodulate, according to the CTU resource, the signal that is transmitted in the grant-free transmission mode, and reduce a range of blind detection. Therefore, a quantity of times of blind detection is reduced, and signaling overheads of a handover process is lowered.

According to this embodiment of the present disclosure, the handover request message may include information about a first CTU resource that is used by the terminal device for grant-free transmission before handover, the handover request acknowledgement message includes the information about the second CTU resource that the second network device allows the terminal device to use, and the handover instruction message includes the information about the second CTU resource.

According to this embodiment of the present disclosure, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource. That is, if the second network device allows the terminal device to access the second network device using an original CTU resource, the second network device adds information about the original CTU resource to the handover request acknowledgement message; if the second network device forbids the terminal device to access the second network device using an original CTU resource, the second network device adds information about a new CTU resource to the handover request acknowledgement message. In addition, if the second network device forbids the terminal device to access the second network device, the second network device may add, to the handover request acknowledgement message, indication information that access by the terminal device is denied.

Alternatively, in another embodiment, if the second network device forbids the terminal device to access the second network device using an original CTU resource, the second network device may add, to the handover request acknowledgement message, information about a new CTU resource that the terminal device is allowed to use, and then, the first network device adds the information about the new CTU resource to the handover instruction message, so that the terminal device transmits the signal on the CTU resource.

According to this embodiment of the present disclosure, the first CTU resource includes a first CTU, and the second CTU resource includes a second CTU.

For example, the first network device may add information about an original CTU to the handover request message. If the second network device allows the terminal device to access the second network device using the original CTU, the second network device adds the information about the original CTU to the handover request acknowledgement message. If the second network device forbids the terminal device to access the second network device using the original CTU, the second network device adds information about a new CTU to the handover request acknowledgement message.

According to this embodiment of the present disclosure, if the second network device allows the UE to still use the original CTU during handover, soft handover can be implemented.

According to this embodiment of the present disclosure, the first CTU resource includes a first code resource, and the second CTU resource includes a second code resource.

For example, if the second network device allows the terminal device to access the second network device using an original code resource, the second network device adds information about the original code resource to the handover request acknowledgement message; if the second network device forbids the terminal device to access the second network device using an original code resource, the second network device adds information about a new code resource to the handover request acknowledgement message.

According to this embodiment of the present disclosure, the handover request message includes information used to indicate that the terminal device supports grant-free transmission, the handover request acknowledgement message includes the information about the second CTU resource that the second network device allows the terminal device to use, and the handover instruction message includes the information about the second CTU resource that the second network device allows the terminal device to use, so that the terminal device transmits the signal on the second CTU resource in the grant-free transmission mode.

For example, the second CTU resource is a contention access region. The first network device indicates, in the handover request message, that the terminal device supports grant-free transmission. After receiving the handover request message, the second network device determines, according to a load status of the second network device or a load status of a contention access region of the second network device, a contention access region (for example, a contention access region with relatively light load) in which the terminal device is allowed to access the second network device, and adds the determined contention access region to the handover request acknowledgement message. Then, the first network device indicates the contention access region to the terminal device in the handover instruction message. The terminal device selects at least one CTU from multiple CTUs in the contention access region indicated in the handover instruction message, to perform grant-free transmission.

According to this embodiment of the present disclosure, a terminal device can flexibly select a CTU according to a contention access region indicated by a second network device. In addition, because the second network device can select, according to a load status of the second network device, a contention access region with relatively light load for access by the terminal device, or determine, according to an overall load status, whether to allow access by the terminal device, the second network device can implement load balancing. Moreover, because the terminal device can select an appropriate CTU according to the contention access region allowed by the second network device, a probability of a collision between terminal devices performing grant-free transmission is reduced.

Alternatively, in another embodiment, the handover request message includes information used to indicate that the terminal device supports grant-free transmission, the handover request acknowledgement message includes information about a CTU that the second network device allows the terminal device to use, and the handover instruction message includes the information about the CTU that the second network device allows the terminal device to use, so that the terminal device transmits the signal on the CTU in the grant-free transmission mode.

Put it another way, the first network device informs the second network device only that the terminal device supports grant-free transmission, and the second network device provides, for the terminal device, the CTU used for accessing the second network device.

According to this embodiment of the present disclosure, the information about the CTU resource includes information about at least one of a time-frequency resource, a code resource, or a pilot, CTU information, or information about the contention access region.

Alternatively, in another embodiment, before the first network device sends the handover request message to the second network device, the method further includes: determining, by the first network device according to at least one of measurement report information of the terminal device or load information of the first network device, that the terminal device needs to be handed over to the second network device.

For example, when the first network device determines, according to channel quality information in a measurement report, that quality of a channel between the second network device and the terminal device is better than quality of a channel between the first network device and the terminal device, the first network device determines to hand over the terminal device to the second network device. For example, when the first network device determines that the terminal device enters a coverage area of the second network device from a coverage area of the first network device, the first network device determines to hand over the terminal device to the second network device. For another example, when load of the first network device is excessively heavy, the first network device determines to hand over the terminal device to the second network device.

It should be understood that this embodiment of the present disclosure is not limited to the foregoing handover decision methods. For example, alternatively, the terminal device may monitor signal strength and quality of a communications port, select, when a handover condition is met, an optimum candidate network device as the second network device, and initiate a handover request to the first network device. The first network device may determine, when receiving the request of the terminal device, to hand over the terminal device to the second network device. For another example, a core network may require a network device within a management area of the core network to report signal strength and quality of a communications link, and perform handover based on the reported signal strength and quality of the communications link. After receiving an instruction of the core network, the second network device determines to hand over the terminal device to the second network device.

Figure 4:
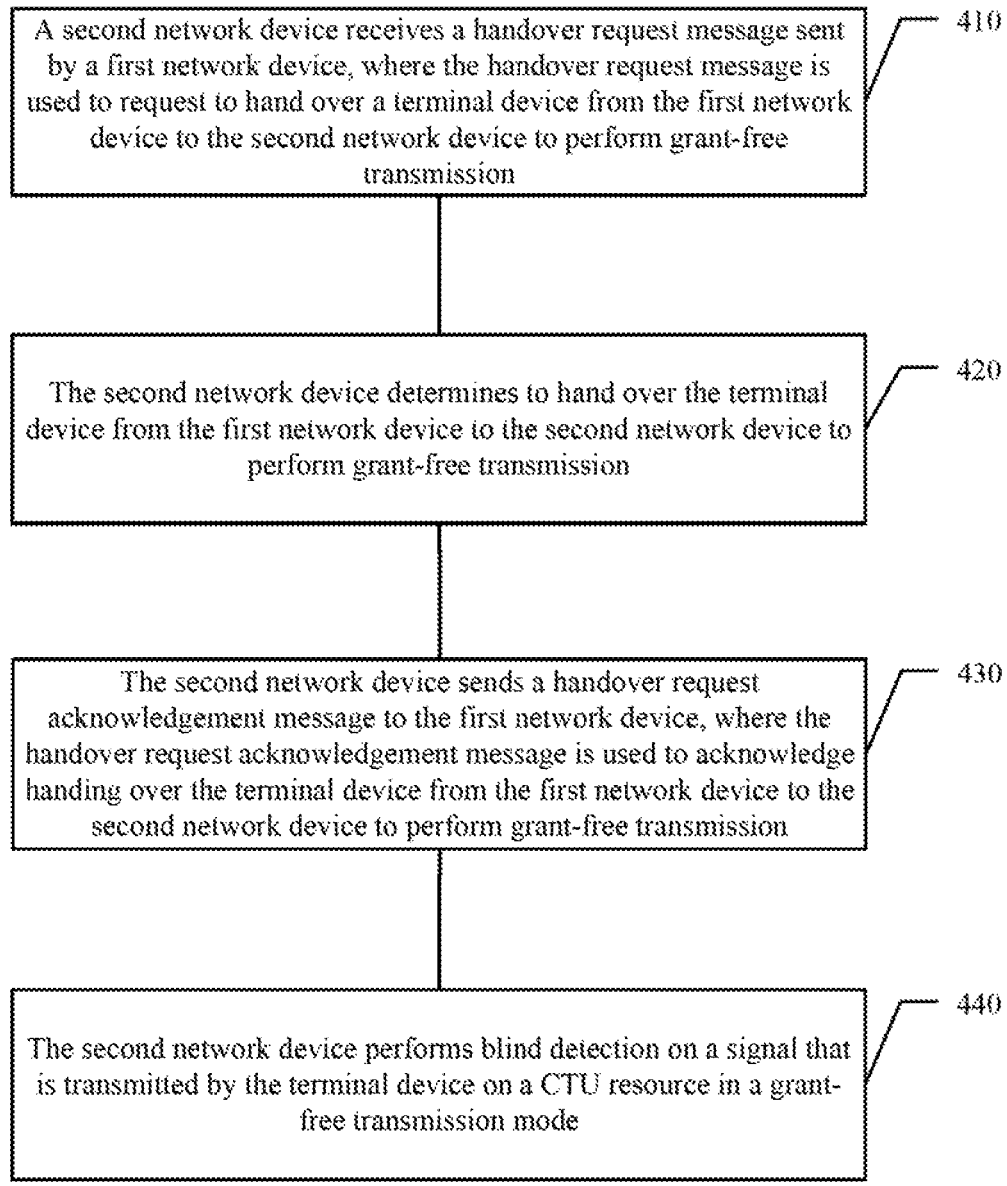
FIG. 4 is a schematic flowchart of a handover method for grant-free transmission according to another embodiment of the present disclosure.

FIG. 4 is a schematic flowchart of a handover method for grant-free transmission according to another embodiment of the present disclosure. The method in FIG. 4 is executed by the network device (for example, a base station) in FIG. 1. The method in FIG. 4 corresponds to the method in FIG. 3, and some details are omitted herein as appropriate.

410: A second network device receives a handover request message sent by a first network device, where the handover request message is used to request to hand over a terminal device from the first network device to the second network device to perform grant-free transmission.

420: The second network device determines to hand over the terminal device from the first network device to the second network device to perform grant-free transmission.

430: The second network device sends a handover request acknowledgement message to the first network device, where the handover request acknowledgement message is used to acknowledge handing over the terminal device from the first network device to the second network device to perform grant-free transmission.

440: The second network device performs blind detection on a signal that is transmitted by the terminal device on a CTU resource in a grant-free transmission mode.

According to this embodiment of the present disclosure, a second network device receives a handover request sent by a first network device, and after determining to allow handover, instructs, using the first network device, a terminal device to transmit a signal to the second network device on a CTU in a grant-free transmission mode. In this way, a terminal device is handed over from a network device to another network device to perform grant-free transmission.

According to this embodiment of the present disclosure, the handover request acknowledgement message includes information about a second CTU resource that the second network device allows the terminal device to use, and a handover instruction message includes the information about the second CTU resource, so that the terminal device transmits the signal on the second CTU resource in the grant-free transmission mode.

According to this embodiment of the present disclosure, the handover request message includes information about a first CTU resource that is used by the terminal device for grant-free transmission before handover. In this case, in step 440, the second network device performs, based on the second CTU resource, blind detection on the signal that is transmitted by the terminal device on the second CTU resource in the grant-free transmission mode.

According to this embodiment of the present disclosure, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource.

According to this embodiment of the present disclosure, the first CTU resource includes a first CTU, and the second CTU resource includes a second CTU.

In step 420, the second network device determines, according to at least one of a load status of a contention access region of the second network device, a load status of the second network device, or the first CTU resource, to hand over the terminal device to the second network device.

For example, after receiving the handover request message, the second network device may firstly determine whether a CTU resource used by the terminal device before handover can be used for accessing the second network device. If a contention access region in which the CTU resource is located has excessively heavy load, the second network device selects, for the terminal device, a CTU resource in a new contention access region with relatively light load. If load of the second network device is excessively heavy, the second network device may also deny access by the terminal device to the second network device.

According to this embodiment of the present disclosure, the handover request message includes information used to indicate that the terminal device supports grant-free transmission, the handover request acknowledgement message includes the information about the second CTU resource that the second network device allows the terminal device to use, and the handover instruction message includes the information about the second CTU resource that the second network device allows the terminal device to use.

In step 420, the second network device determines, according to at least one of a load status of a contention access region of the second network device or a load status of the second network device, to hand over the terminal device to the second network device.

For example, after receiving the handover request message, the second network device determines, according to a load status of the second network device or a load status of a contention access region of the second network device, a contention access region (for example, a contention access region with relatively light load) in which the terminal device is allowed to access the second network device, and adds the determined contention access region to the handover request acknowledgement message. Then, the first network device indicates the contention access region to the terminal device in the handover instruction message. If load of the second network device is excessively heavy, the second network device may also deny access by the terminal device to the second network device.

According to this embodiment of the present disclosure, the information about the CTU resource includes information about at least one of a time-frequency resource, a code resource, or a pilot, CTU information, or information about the contention access region.

Figure 5:
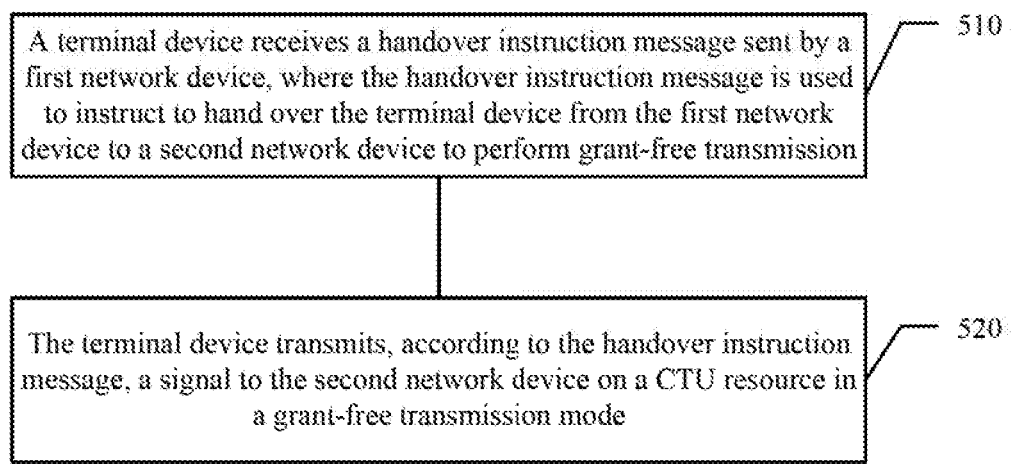
FIG. 5 is a schematic flowchart of a handover method for grant-free transmission according to still another embodiment of the present disclosure.

FIG. 5 is a schematic flowchart of a grant-free transmission method according to still another embodiment of the present disclosure. The method in FIG. 5 is executed by the terminal device in FIG. 1. The method in FIG. 5 corresponds to the method in FIG. 3, and some details are omitted herein as appropriate.

510: A terminal device receives a handover instruction message sent by a first network device, where the handover instruction message is used to instruct to hand over the terminal device from the first network device to a second network device to perform grant-free transmission.

520: The terminal device transmits, according to the handover instruction message, a signal to the second network device on a CTU resource in a grant-free transmission mode.

According to this embodiment of the present disclosure, after receiving a handover instruction sent by a first network device, a terminal device that performs grant-free transmission with the first network device transmits a signal to a second network device on a CTU in a grant-free transmission mode. In this way, a terminal device is handed over from a network device to another network device to perform grant-free transmission.

According to this embodiment of the present disclosure, the terminal device performs grant-free transmission using a first CTU resource before handover, and the handover instruction message includes information about a second CTU resource that the second network device allows the terminal device to use, so that the terminal device transmits the signal on the second CTU resource in the grant-free transmission mode.

According to this embodiment of the present disclosure, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource.

According to this embodiment of the present disclosure, in step 520, the terminal device determines, according to the information about the second CTU resource carried in the handover instruction message, a CTU that is to be used in grant-free transmission performed after the terminal device is handed over to the second network device; the terminal device transmits the signal on the CTU in the grant-free transmission mode.

According to this embodiment of the present disclosure, the second CTU resource is a contention access region. When the terminal device determines the CTU that is to be used in grant-free transmission performed after the terminal device is handed over to the second network device, the terminal device may determine a quantity of CTUs in the contention access region according to the information about the contention access region carried in the handover instruction message, and determine the CTU according to the following formula:

$$\mathrm{Indx}_{CTU} = \mathrm{Sig}_i \bmod N_{CTU},$$

where $\mathrm{Indx}_{CTU}$ is an index number of the CTU, mod represents a modulo operation, $N_{CTU}$ represents the quantity of the CTUs in the contention access region, and $\mathrm{Sig}_i$ represents an index of a code resource of the terminal device.

According to this embodiment of the present disclosure, the information about the CTU resource includes information about at least one of a time-frequency resource, a code resource, or a pilot, CTU information, or the information about the contention access region.

The following describes this embodiment of the present disclosure in more detail with reference to specific examples. In this embodiment, descriptions are provided using an example in which a base station is used as a network device.

According to this embodiment of the present disclosure, in a grant-free transmission scenario, when UE enters a coverage area of the base station, the UE can receive higher layer signaling sent by the base station. The higher layer signaling may carry a CTU access region definition, a total quantity of CTUs, a default mapping rule, and the like. Alternatively, a default mapping rule may be preconfigured on the UE. The UE may determine an appropriate CTU from multiple CTUs in a CTU access region, to perform grant-free transmission on the CTU. When different UEs perform grant-free transmission on a same CTU, that is, contend for a same CTU, a collision occurs. The UE may determine, according to an indication of the base station, whether a collision exists. For example, a problem resulting from a collision can be resolved using an asynchronous hybrid automatic repeat request (HARQ) method. If a quantity of collisions exceeds a preset threshold, the UE may request the base station to remap a CTU. The base station sends information about a remapped CTU to the UE, so that the UE performs grant-free transmission on the remapped CTU.

However, in some scenarios, for example, when load of a base station (source base station) that UE currently accesses is excessively heavy or channel quality is relatively poor, or when UE enters a coverage area of a base station from a coverage area of another base station, the UE needs to be handed over from the source base station to another base station (target base station) to perform grant-free transmission.

Figure 6:
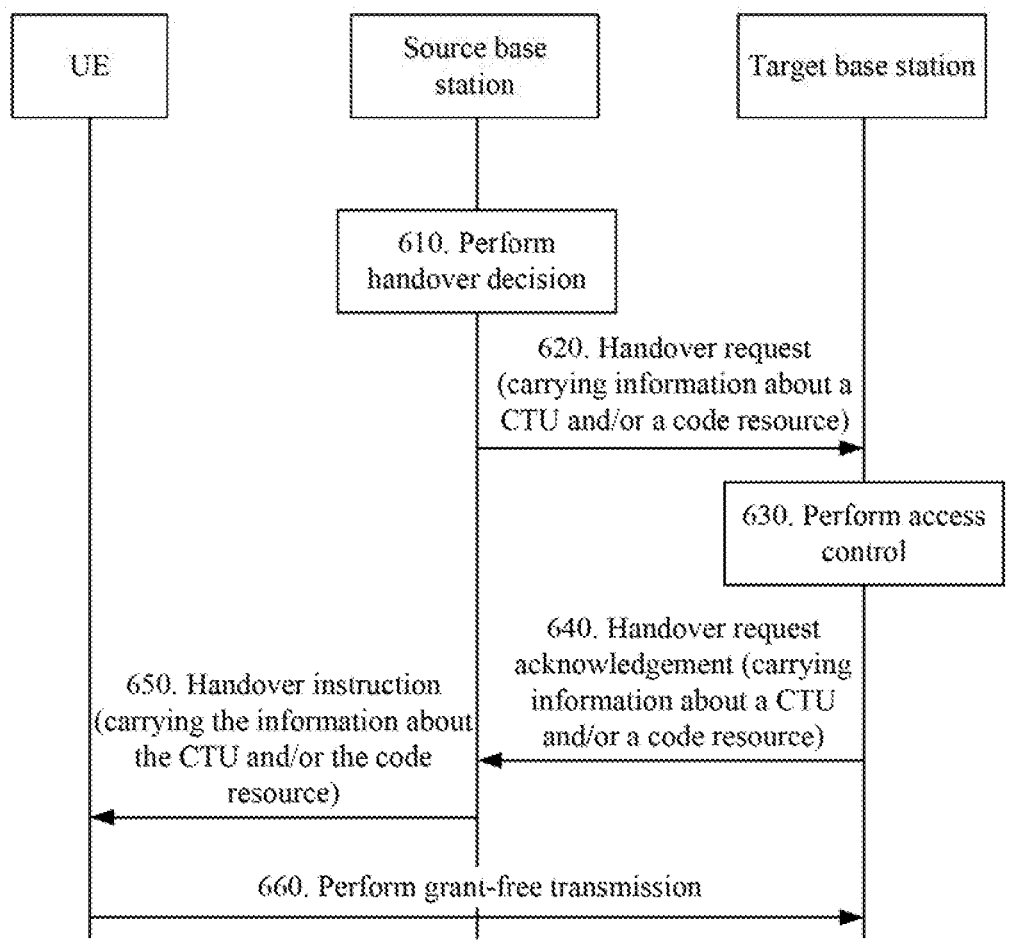
FIG. 6 is a schematic flowchart of a handover process for grant-free transmission according to another embodiment of the present disclosure.
Figure 7:
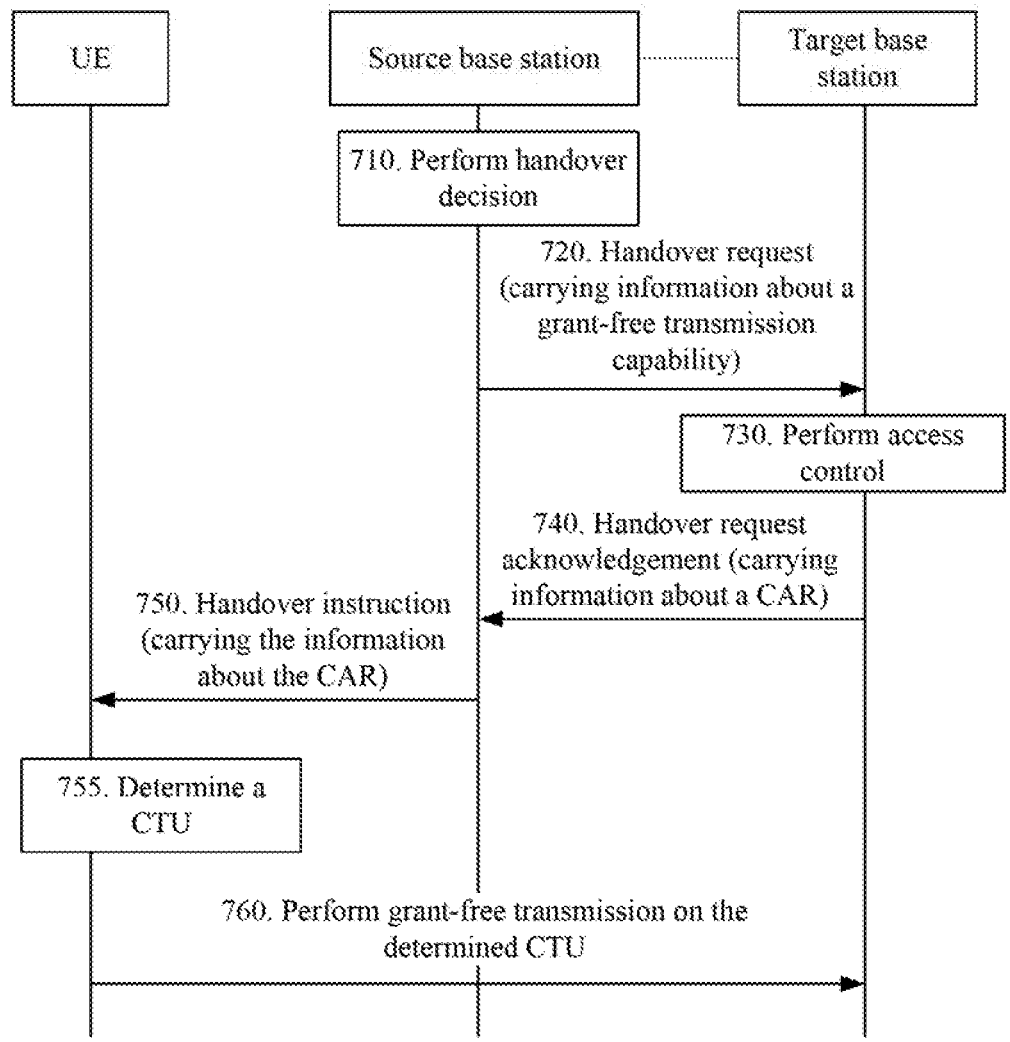
FIG. 7 is a schematic flowchart of a handover process for grant-free transmission according to another embodiment of the present disclosure.

The following describes a handover process for grant-free transmission in detail with reference to embodiments in FIG. 6 and FIG. 7.

FIG. 6 is a schematic flowchart of a handover process for grant-free transmission according to another embodiment of the present disclosure. The process in FIG. 6 is an example of the methods in FIG. 3, FIG. 4, and FIG. 5. Some details are omitted herein as appropriate.

610: A source base station performs handover decision to determine whether to hand over UE to a target base station.

The source base station determines, according to measurement report information (such as channel quality information) reported by the UE and/or according to load information (for example, load of the source base station is excessively heavy) of the source base station, to hand over the UE to the target base station.

Specifically, the source base station may deliver different types of measurement tasks to the UE, for example, may deliver a measurement configuration using a measurement control message in a Time Division-Synchronous Code Division Multiple Access (TD-SCDMA) scenario or deliver a measurement configuration using an RRC connection reconfiguration message in an LTE scenario. After receiving the measurement configuration, the UE performs measurement and sends, after a measurement result meets a report condition, a corresponding measurement report to the source base station. The source base station determines, according to the measurement report reported by the terminal, whether to perform handover. For example, when the source base station determines, according to channel quality information in the measurement report, that quality of a channel between the target base station and the UE is better than quality of a channel between the source base station and the UE, the source base station determines to hand over the UE to the target base station. This embodiment of the present disclosure is not limited thereto. Handover decision may also be performed according to other information in the measurement report. For example, when load of the source base station is excessively heavy, the source base station determines to hand over the UE to the target base station.

620: The source base station sends a handover request message to the target base station, to request to hand over the UE to the target base station, where the handover request message carries information about a CTU and/or a code resource.

For example, if the source base station determines to hand over the UE to the target base station, the source base station may add, to the handover request message, a CTU and/or a code resource that are/is selected for grant-free transmission by the UE. The CTU is a basic resource for grant-free transmission, and includes but is not limited to a combination of a time resource, a frequency resource, a code resource, and a pilot. When performing grant-free transmission, the UE maps to-be-transmitted data to a CTU to perform grant-free transmission. The code resource used by the UE is a CDMA code, an SCMA code, an LDS, another signature, or the like allocated by a network side to the UE for grant-free transmission.

The source base station may explicitly indicate, using the handover request message, whether the UE uses or supports grant-free transmission mode transmission. For example, when the source base station determines to hand over the UE to the target base station, the source base station may send the handover request message to the target base station, and indicate, in the handover request message, whether the UE is performing grant-free transmission. For example, whether the UE uses or supports grant-free transmission may be indicated using an information element (IE), for example, a grant-free transmission capability (Capability of Grant Free). For example, if a value of the grant-free transmission capability is 1, it indicates that the UE uses grant-free transmission. This embodiment of the present disclosure is not limited thereto. Alternatively, a value of the grant-free transmission capability being 0 may indicate that the UE uses grant-free transmission, or a case in which there is a value at a location of the grant-free transmission capability in an information element may indicate that the UE uses grant-free transmission.

Alternatively, the target base station may determine, according to whether the handover request message carries the CTU selected for grant-free transmission by the UE and/or the code resource used by the UE, whether the UE uses grant-free transmission mode transmission.

For example, as shown in Table 1, the following information elements (IE) may be added to the handover request message sent from the source base station to the target base station.

TABLE 1

| Information element (IE) | Presentation manner (Presence) | Type (Type) | Description (Description) |
| --- | --- | --- | --- |
| Contention transmission unit | O (optional) | Integer (0 to 4095) | Index of a contention transmission unit of UE |
| UE signature | O (optional) | Integer (0 to 4095) | Index of a signature or a code of UE |

630: After receiving the handover request message of the source base station, the target base station performs access control.

After receiving the handover request message of the source base station, the target base station determines, according to a load status of the target base station, for example, a load status of a contention access region (CAR) and/or an overall load status of the target base station and a CTU and/or a code resource that the UE originally uses, whether the UE can access the target base station and whether the UE can use a specific contention access region. When performing grant-free transmission, the UE maps to-be-transmitted data to a specific CTU in a specific contention access region to perform grant-free transmission.

For example, the target base station may determine, according to an overall load status of the target base station, whether the UE can access the target base station. If overall load of the target base station is excessively heavy (for example, greater than a preset threshold), the target base station forbids the UE to access the target base station. Otherwise, the target base station allows the UE to access the target base station. In a grant-free transmission mode, a resource of each target base station may be divided into multiple contention access regions, and each contention access region may include one or more CTUs. The CTU is a basic resource for grant-free transmission, and includes but is not limited to a combination of a time resource, a frequency resource, a code resource, and a pilot. Further, if a contention access region, of the target base station, corresponding to the CTU that the UE originally uses has relatively heavy load, a CTU and/or a code resource in a new contention access region with relatively light load are/is selected. Otherwise, the original CTU and/or code resource are/is used.

640: The target base station sends a handover request acknowledgement message to the source base station, to acknowledge handing over the UE from the source base station to the target base station to perform grant-free transmission, where the handover request acknowledgement message carries information about a CTU and/or a code resource.

If the target base station allows the UE to access the target base station using the original CTU and/or code resource, the target base station instructs, in the handover request acknowledgement message in step 640, the UE to use the original CTU and/or code resource to perform grant-free transmission.

If the target base station forbids the UE to access the target base station using the original CTU and/or code resource, the target base station indicates, in the handover request acknowledgement message in step 640, a new CTU and/or code resource to the UE.

For example, as shown in Table 2, the following information elements are added to the handover request acknowledgement message sent from the target base station to the source base station.

TABLE 2

| Information element (IE) | Presentation manner (Presence) | Type (Type) | Description (Description) |
|---|---|---|---|
| Contention transmission unit | O (optional) | Integer (0 to 4095) | Index of a contention transmission unit of UE |
| UE signature | O (optional) | Integer (0 to 4095) | Index of a signature or a code of UE |

650: The source base station sends a handover instruction message to the UE, to instruct to hand over the UE to the target base station, that is, to instruct the UE to transmit a signal to the target base station on the CTU in a grant-free transmission mode, where the handover instruction message carries the information about the CTU and/or the code resource.

The source base station may add, to the handover instruction message, a parameter required for handover of the UE. For example, the parameter includes an ID of the target base station, a target power, and configurations of a radio resource and a physical resource, such as a CTU and/or a code resource.

It should be understood that the handover instruction message may be implemented by modifying or extending existing signaling. For example, the handover instruction message may be an RRC connection reconfiguration message. A difference from a conventional RRC connection reconfiguration message lies in that, the handover instruction message may carry information about a CTU, rather than information about a frequency channel number, that the target base station allows the UE to use for access. This embodiment of the present disclosure is not limited thereto. For example, the base station may instruct, using dedicated higher layer signaling, to hand over the UE to the target base station.

660: The UE performs grant-free transmission with the target base station on the CTU.

The UE may determine, according to the handover instruction message, the CTU allowed by the target base station, disconnect from the source base station, and map to-be-transmitted data to the CTU allowed by the target base station, to perform grant-free transmission. For specific descriptions about grant-free transmission, refer to the embodiment in FIG. 2, and details are not described herein again.

An advantage of this embodiment is as follows: Because a target base station knows, according to a handover request message sent by a source base station, a CTU and/or a code resource that are/is used by UE, the target base station can quickly demodulate, according to information about the CTU and/or the code resource, data that is transmitted by the UE in a grant-free transmission mode, and reduce a range of blind detection. Therefore, a quantity of times of blind detection is reduced, and signaling overheads of a handover process is lowered. In addition, if the UE still uses the original CTU and/or code resource in the handover process, soft handover can be implemented.

FIG. 7 is a schematic flowchart of a handover process for grant-free transmission according to another embodiment of the present disclosure. The process in FIG. 7 is an example of the methods in FIG. 3, FIG. 4, and FIG. 5. Some details are omitted herein as appropriate.

710: A source base station determines to hand over UE to a target base station.

The source base station determines, according to measurement report information (such as channel quality information) reported by the UE and/or according to load information (for example, load of the source base station is excessively heavy) of the source base station, to hand over the UE to the target base station. Step 710 is similar to step 610, and details are not described herein again.

720: The source base station sends a handover request message to the target base station, to request to hand over the UE to the target base station, where the handover request message carries information about a grant-free transmission capability.

For example, when the source base station determines to hand over the UE to the target base station the source base station may send the handover request message to the target base station, and indicate, in the handover request message, that the UE uses grant-free transmission. For example, that the UE uses grant-free transmission may be indicated using an information element (IE), for example, a grant-free transmission capability (Capability of Grant Free). If a value of the grant-free transmission capability is 1, it indicates that the UE uses grant-free transmission. This embodiment of the present disclosure is not limited thereto. Alternatively, a value of the grant-free transmission capability being 0 may indicate that the UE uses grant-free transmission, or a case in which there is a value at a location of the grant-free transmission capability in an information element may indicate that the UE uses grant-free transmission.

For example, as shown in Table 3, the following information element (IE) may be added to the handover request message sent from the source base station to the target base station.

TABLE 3

| Information element (IE) | Presentation manner (Presence) | Type (Type) | Description (Description) |
|---|---|---|---|
| Grant-free transmission capability (Capability of Grant Free) | O (optional) | Integer (0 or 1) | 1 indicates that UE uses grant-free transmission; 0 indicates that UE does not use grant-free transmission |

730: After receiving the handover request message of the source base station, the target base station performs access control.

If the target base station determines, according to the handover request message, that the UE uses grant-free transmission mode transmission, the target base station determines, according to a load status of the target base station, for example, a load status of a contention access region (CAR) and/or an overall load status of the target base station, whether the UE can access the target base station and whether the UE can use a specific contention access region.

In a grant-free transmission mode, a resource of each target base station may be divided into multiple contention access regions, and each contention access region may include one or more CTUs. The CTU is a basic resource for grant-free transmission, and includes but is not limited to a combination of a time resource, a frequency resource, a code resource, and a pilot. When performing grant-free transmission, the UE maps to-be-transmitted data to a specific CTU in a specific contention access region to perform grant-free transmission.

For example, the target base station may determine, according to an overall load status of the target base station, whether the UE can access the target base station. If overall load of the target base station is excessively heavy (for example, greater than a preset threshold), the target base station forbids the UE to access the target base station. Otherwise, the target base station allows the UE to access the target base station. After determining to allow access by the UE, the target base station may further determine, according to load of a contention access region of the target base station, a contention access region whose CTU the UE is allowed to use. For example, if load of a contention access region is less than a preset threshold, the target base station allows the UE to use a CTU in the contention access region. If the target base station determines, according to the load status of the contention access region and/or the overall load status of the target base station, that the UE can access the target base station, the target base station may select a contention access region with relatively light load, and instructs, in step 740, the UE to access the target base station in the contention access region.

740: The target base station sends a handover request acknowledgement message to the source base station, to acknowledge handing over the UE from the source base station to the target base station to perform grant-free transmission, that is, to inform the source base station that the target base station has prepared a resource used for grant-free transmission, where the handover request acknowledgement message carries information about a contention access region.

If the target base station allows the UE to access the target base station, the target base station sends the handover request acknowledgement message to the source base station, and indicates, in the handover request acknowledgement message, the contention access region that the UE can access. For example, the target base station may add the information (for example, an identifier or an index) about the contention access region to the handover request acknowledgement message. However, this embodiment of the present disclosure is not limited thereto. For example, alternatively, the target base station may implicitly inform the source base station of the information about the contention access region in a manner that is agreed on by the two communication parties.

If the target base station forbids the UE to access the target base station, the target base station may add, to the handover request acknowledgement message, information that access by the UE to the target base station is denied. In this way, after receiving the handover request acknowledgement message, the source base station determines that the target base station forbids the UE to access the target base station, and therefore terminates this handover process.

Alternatively, if the target base station forbids the UE to access the target base station, the target base station may make no response to the handover request of the source base station. In this case, the source base station still has not received handover request acknowledgement message after a preset time expires. Therefore, the source base station determines that the target base station forbids the UE to access the target base station, so as to terminate this handover process.

For example, as shown in Table 4, the following information element (IE) is added to the handover request acknowledgement message sent from the target base station to the source base station.

TABLE 4

| Information element (IE) | Presentation manner (Presence) | Type (Type) | Description (Description) |
|---|---|---|---|
| Contention access region | O (optional) | Integer (Integer) (0 to 4095) | Index of a contention access region |

750: The source base station sends a handover instruction message to the UE, to instruct to hand over the UE to the target base station, that is, to instruct the UE to transmit a signal to the target base station on a CTU in a grant-free transmission mode, where the handover instruction message carries the information about the contention access region.

The source base station may add, to the handover instruction message, a parameter required for handover of the UE. For example, the parameter includes an ID of the target base station, a target power, and configurations of a radio resource and a physical resource, such as a contention access region.

It should be understood that the handover instruction message may be implemented by modifying or extending existing signaling. For example, the handover instruction message may be an RRC connection reconfiguration message. A difference from a conventional RRC connection reconfiguration message lies in that, the handover instruction message may carry information about an accessible contention access region (CAR), rather than information about a frequency channel number. Modifying or extending the RRC connection reconfiguration message can reduce signaling overheads. This embodiment of the present disclosure is not limited thereto. For example, the base station may instruct, using dedicated higher layer signaling, to hand over the UE to the target base station.

755: The UE determines a CTU used for grant-free transmission.

For example, after receiving the handover instruction message, the UE determines, according to the handover instruction message, that the target base station allows the UE to access the target base station, and determines, according to the contention access region carried in the handover instruction message, a CTU used for grant-free transmission.

The following uses an example to describe a method for determining a CTU used for grant-free transmission. The CTU may be determined according to a default mapping rule. For example, the UE may determine, according to an index number $\text{Indx}_{CTU}$ of a CTU, the CTU used for grant-free transmission. The UE may determine the index number $\text{Indx}_{CTU}$ of the CTU according to the following formula:

$$\text{Indx}_{CTU} = \text{Sig}_i \bmod N_{CTU},$$

where "mod" represents a modulo operation, $N_{CTU}$ is a quantity of CTUs in the contention access region, and $\text{Sig}_i$ is an index of a code resource or a signature sequence used by the UE for grant-free transmission. For example, $\text{Sig}_i$ may be an index of a dedicated connection signature (DCS) allocated to the UE.

It should be understood that the CTU used for grant-free transmission may be determined using another method. For example, an appropriate CTU may be randomly selected from available CTUs.

760: The UE performs grant-free transmission with the target base station on the CTU.

After selecting the CTU, the UE may disconnect from the source base station, and map to-be-transmitted data to the selected CTU to perform grant-free transmission. For specific descriptions about grant-free transmission, refer to the embodiment in FIG. 2, and details are not described herein again.

An advantage of this embodiment is as follows: UE can flexibly select a CTU according to a contention access region indicated by a target base station. In addition, because the target base station can select, according to a load status of the target base station, a contention access region with relatively light load for access by the UE, or determine, according to an overall load status, whether to allow access by the UE, the target base station can implement load balancing. Moreover, because the UE can select an appropriate CTU according to the contention access region allowed by the target base station, a probability of a collision between UEs performing grant-free transmission is reduced.

The foregoing describes a handover method according to the embodiments of the present disclosure. The following separately describes a network device and a terminal device according to embodiments of the present disclosure with reference to FIG. 8 to FIG. 13.

Figure 8:
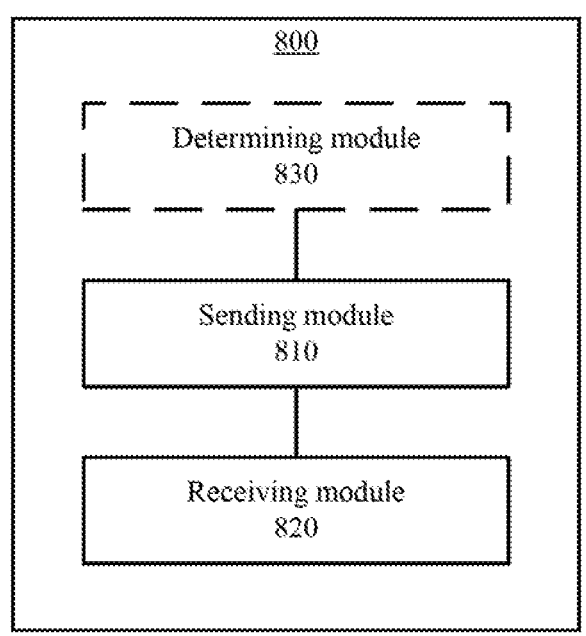
FIG. 8 is a schematic structural diagram of a network device according to an embodiment of the present disclosure.

FIG. 8 is a schematic structural diagram of a network device 800 according to an embodiment of the present disclosure. The network device 800 includes a sending module 810 and a receiving module 820.

The sending module 810 is configured to send a handover request message to a second network device. The handover request message is used to request to hand over a terminal device from the network device to the second network device to perform grant-free transmission. The receiving module 820 is configured to receive a handover request acknowledgement message sent by the second network device. The handover request acknowledgement message is used to acknowledge handing over the terminal device from the network device to the second network device to perform grant-free transmission. The sending module 810 is further configured to send a handover instruction message to the terminal device. The handover instruction message is used to instruct the terminal device to transmit a signal to the second network device on a contention transmission unit CTU resource in a grant-free transmission mode.

According to this embodiment of the present disclosure, a first network device requests, to a second network device, to hand over a terminal device from the first network device to the second network device to perform grant-free transmission, and instructs, after the second network device allows the handover, the terminal device to transmit a signal to the second network device on a CTU in a grant-free transmission mode. In this way, a terminal device is handed over from a network device to another network device to perform grant-free transmission.

According to this embodiment of the present disclosure, the handover request acknowledgement message includes information about a second CTU resource that the second network device allows the terminal device to use, and the handover instruction message includes the information about the second CTU resource, so that the terminal device transmits the signal on the second CTU resource in the grant-free transmission mode.

According to this embodiment of the present disclosure, the handover request message includes information about a first CTU resource that is used by the terminal device for grant-free transmission before handover.

According to this embodiment of the present disclosure, the second CTU resource is the same as the first CTU resource if the second network device allows the terminal device to perform grant-free transmission using the first CTU resource, or the second CTU resource is different from the first CTU resource if the second network device forbids the terminal device to perform grant-free transmission using the first CTU resource.

According to this embodiment of the present disclosure, the handover request message includes information used to indicate that the terminal device supports grant-free transmission, the handover request acknowledgement message includes the information about the second CTU resource that the second network device allows the terminal device to use, and the handover instruction message includes the information about the second CTU resource that the second network device allows the terminal device to use, so that the terminal device transmits the signal on the second CTU resource in the grant-free transmission mode.

According to this embodiment of the present disclosure, the information about the CTU resource includes information about at least one of a time-frequency resource, a code resource, or a pilot, CTU information, or information about a contention access region.

Optionally, in another embodiment, the network device 800 further includes a determining module 830, configured to determine, before the network device 800 sends the handover request message to the second network device and according to at least one of measurement report information of the terminal device or load information of the network device, that the terminal device needs to be handed over to the second network device.

For operations and functions of the modules of the network device 800, refer to the method in FIG. 3. To avoid repetition, details are not described herein again.

Figure 9:
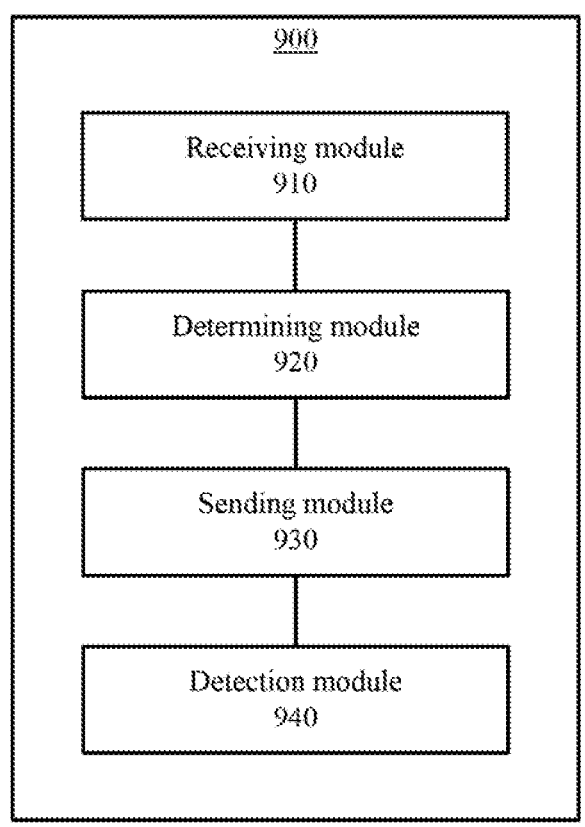
FIG. 9 is a schematic structural diagram of a network device according to another embodiment of the present disclosure.

FIG. 9 is a schematic structural diagram of a network device 900 according to another embodiment of the present disclosure. The network device 900 includes a receiving module 910, a determining module 920, a sending module 930, and a detection module 940.

The receiving module 910 is configured to receive a handover request message sent by a first network device.

The handover request message is used to request to hand over a terminal device from the first network device to the network device to perform grant-free transmission.

The determining module 920 is configured to determine to hand over the terminal device from the first network device to the network device to perform grant-free transmission.

The sending module 930 is configured to send a handover request acknowledgement message to the first network device. The handover request acknowledgement message is used to acknowledge handing over the terminal device from the first network device to the network device to perform grant-free transmission.

The detection module 940 is configured to perform blind detection on a signal that is transmitted by the terminal device on a CTU resource in a grant-free transmission mode.

According to this embodiment of the present disclosure, a second network device receives a handover request sent by a first network device, and after determining to allow handover, instructs, using the first network device, a terminal device to transmit a signal to the second network device on a CTU in a grant-free transmission mode. In this way, a terminal device is handed over from a network device to another network device to perform grant-free transmission.

According to this embodiment of the present disclosure, the handover request acknowledgement message includes information about a contention access region or a second CTU resource that the network device allows the terminal device to use, and a handover instruction message includes the information about the contention access region or the second CTU resource, so that the terminal device transmits the signal in the grant-free transmission mode according to the information about the contention access region or the second CTU resource.

According to this embodiment of the present disclosure, the handover request message includes information about a first CTU resource that is used by the terminal device for grant-free transmission before handover, and the detection module 940 performs, based on the second CTU resource, blind detection on the signal that is transmitted by the terminal device on the second CTU resource in the grant-free transmission mode.

According to this embodiment of the present disclosure, the second CTU resource is the same as the first CTU resource if the network device allows the terminal device to perform grant-free transmission using the first CTU resource; or the second CTU resource is different from the first CTU resource if the network device forbids the terminal device to perform grant-free transmission using the first CTU resource.

According to this embodiment of the present disclosure, the determining module 920 determines, according to at least one of a load status of a contention access region of the network device, a load status of the network device, or the first CTU resource, to hand over the terminal device to the network device.

According to this embodiment of the present disclosure, the handover request message includes information used to indicate that the terminal device supports grant-free transmission, the handover request acknowledgement message includes the information about the second CTU resource that the network device allows the terminal device to use, and the handover instruction message includes the information about the second CTU resource that the network device allows the terminal device to use.

According to this embodiment of the present disclosure, the determining module 920 determines, according to at least one of a load status of a contention access region of the network device or a load status of the network device, to hand over the terminal device to the network device.

According to this embodiment of the present disclosure, the information about the CTU resource includes information about at least one of a time-frequency resource, a code resource, or a pilot, CTU information, or the information about the contention access region.

For operations and functions of the modules of the network device 900, refer to the method in FIG. 4. To avoid repetition, details are not described herein again.

Figure 10:
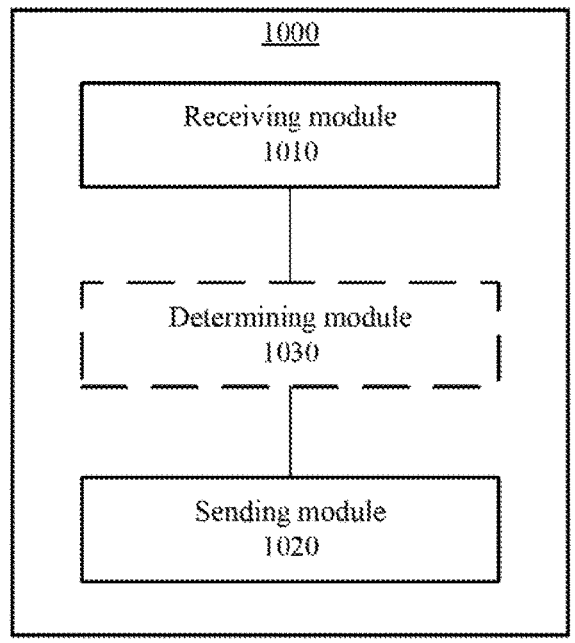
FIG. 10 is a schematic structural diagram of a terminal device according to another embodiment of the present disclosure.

FIG. 10 is a schematic structural diagram of a terminal device 1000 according to another embodiment of the present disclosure. The terminal device 1000 includes a receiving module 1010 and a sending module 1020.

The receiving module 1010 is configured to receive a handover instruction message sent by a first network device. The handover instruction message is used to instruct to hand over the terminal device from the first network device to a second network device to perform grant-free transmission. The sending module 1020 is configured to transmit, according to the handover instruction message, a signal to the second network device on a contention transmission unit CTU resource in a grant-free transmission mode.

According to this embodiment of the present disclosure, after receiving a handover instruction sent by a first network device, a terminal device that performs grant-free transmission with the first network device transmits a signal to a second network device on a CTU in a grant-free transmission mode. In this way, a terminal device is handed over from a network device to another network device to perform grant-free transmission.

According to this embodiment of the present disclosure, the terminal device performs grant-free transmission using a first CTU resource before handover, and the handover instruction message includes information about a second CTU resource that the second network device allows the terminal device to use, so that the terminal device transmits the signal on the second contention transmission unit CTU resource in the grant-free transmission mode.

According to this embodiment of the present disclosure, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource.

Optionally, in another embodiment, the terminal device 1000 further includes a determining module 1030, configured to determine, according to the information about the second CTU resource carried in the handover instruction message, a CTU that is to be used in grant-free transmission performed after the terminal device is handed over to the second network device; the sending module 1020 transmits the signal on the CTU in the grant-free transmission mode.

According to this embodiment of the present disclosure, the second CTU resource is a contention access region, and the determining module 1030 determines a quantity of CTUs in the contention access region according to the information about the contention access region carried in the handover instruction message.

The determining module 1030 determines the CTU according to the following formula:

$$\text{Indx}_{CTU} = \text{Sig}_i \bmod N_{CTU},$$

where $\text{Indx}_{CTU}$ is an index number of the CTU, mod represents a modulo operation, $N_{CTU}$ represents the quantity of the CTUs in the contention access region, and $Sig_i$ represents an index of a code resource of the terminal device.

According to this embodiment of the present disclosure, the information about the CTU resource includes information about at least one of a time-frequency resource, a code resource, or a pilot, CTU information, or the information about the contention access region.

For operations and functions of the modules of the terminal device 1000, refer to the method in FIG. 5. To avoid repetition, details are not described herein again.

Figure 11:
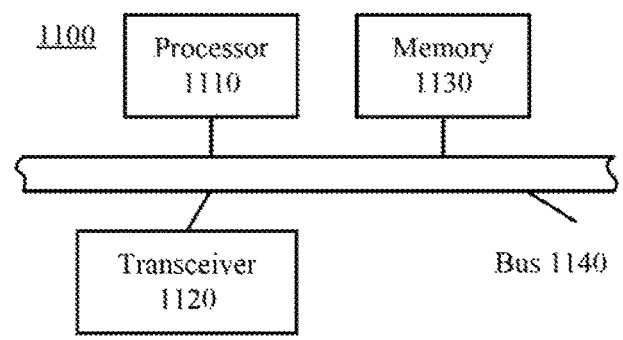
FIG. 11 is a schematic structural diagram of a network device according to an embodiment of the present disclosure.

FIG. 11 is a schematic structural diagram of a network device 1100 according to an embodiment of the present disclosure. The network device 1100 includes a processor 1110, a transceiver 1120, a memory 1130, and a bus 1140.

The transceiver 1120 is configured to send a handover request message to a second network device. The handover request message is used to request to hand over a terminal device from the network device to the second network device to perform grant-free transmission. The transceiver 1120 is further configured to receive a handover request acknowledgement message sent by the second network device. The handover request acknowledgement message is used to acknowledge handing over the terminal device from the network device to the second network device to perform grant-free transmission. The transceiver 1120 is further configured to send a handover instruction message to the terminal device. The handover instruction message is used to instruct the terminal device to transmit a signal to the second network device on a contention transmission unit CTU resource in a grant-free transmission mode.

According to this embodiment of the present disclosure, a first network device requests, to a second network device, to hand over a terminal device from the first network device to the second network device to perform grant-free transmission, and instructs, after the second network device allows the handover, the terminal device to transmit a signal to the second network device on a CTU in a grant-free transmission mode. In this way, a terminal device is handed over from a network device to another network device to perform grant-free transmission.

According to this embodiment of the present disclosure, the handover request acknowledgement message includes information about a second CTU resource that the second network device allows the terminal device to use, and the handover instruction message includes the information about the second CTU resource, so that the terminal device transmits the signal on the second CTU resource in the grant-free transmission mode.

According to this embodiment of the present disclosure, the handover request message includes information about a first CTU resource that is used by the terminal device for grant-free transmission before handover.

According to this embodiment of the present disclosure, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the rust CTU resource.

According to this embodiment of the present disclosure, the handover request message includes information used to indicate that the terminal device supports grant-free transmission, the handover request acknowledgement message includes the information about the second CTU resource that the second network device allows the terminal device to use, and the handover instruction message includes the information about the second CTU resource that the second network device allows the terminal device to use, so that the terminal device transmits the signal on the second CTU resource in the grant-free transmission mode.

According to this embodiment of the present disclosure, the information about the CTU resource includes information about at least one of a time-frequency resource, a code resource, or a pilot. CTU information, or information about a contention access region.

Optionally, in another embodiment, the processor 1110 is configured to determine, before the network device sends the handover request message to the second network device and according to at least one of measurement report information of the terminal device or load information of the network device, that the terminal device needs to be handed over to the second network device.

For operations and functions of the network device 1100, refer to the method in FIG. 3. To avoid repetition, details are not described herein again.

Figure 12:
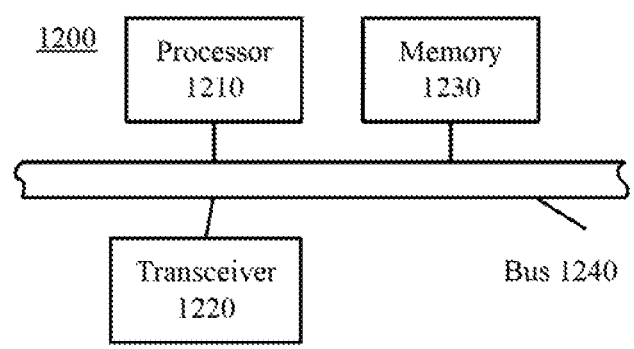
FIG. 12 is a schematic structural diagram of a network device according to another embodiment of the present disclosure.

FIG. 12 is a schematic structural diagram of a network device 1200 according to another embodiment of the present disclosure. The network device 1200 includes a processor 1210, a transceiver 1220, a memory 1230, and a bus 1240.

The transceiver 1220 is configured to receive a handover request message sent by a first network device. The handover request message is used to request to hand over a terminal device from the first network device to the network device to perform grant-free transmission.

The processor 1210 is configured to invoke code stored in the memory 1230, to determine to hand over the terminal device from the first network device to the network device to perform grant-free transmission.

The transceiver 1220 is further configured to send a handover request acknowledgement message to the first network device. The handover request acknowledgement message is used to acknowledge handing over the terminal device from the first network device to the network device to perform grant-free transmission.

The processor 1210 is further configured to perform blind detection on a signal that is transmitted by the terminal device on a CTU resource in a grant-free transmission mode.

According to this embodiment of the present disclosure, a second network device receives a handover request sent by a first network device, and after determining to allow handover, instructs, using the first network device, a terminal device to transmit a signal to the second network device on a CTU in a grant-free transmission mode. In this way, a terminal device is handed over from a network device to another network device to perform grant-free transmission.

According to this embodiment of the present disclosure, the handover request acknowledgement message includes information about a contention access region or a second CTU resource that the network device allows the terminal device to use, and a handover instruction message includes the information about the contention access region or the second CTU resource, so that the terminal device transmits the signal in the grant-free transmission mode according to the information about the contention access region or the second CTU resource.

According to this embodiment of the present disclosure, the handover request message includes information about a first CTU resource that is used by the terminal device for grant-free transmission before handover, and the processor 1210 performs, based on the second CTU resource, blind detection on the signal that is transmitted by the terminal device on the second CTU resource in the grant-free transmission mode.

According to this embodiment of the present disclosure, the second CTU resource is the same as the first CTU resource if the network device allows the terminal device to perform grant-free transmission using the first CTU resource; or the second CTU resource is different from the first CTU resource if the network device forbids the terminal device to perform grant-free transmission using the first CTU resource.

According to this embodiment of the present disclosure, the processor 1210 determines, according to at least one of a load status of a contention access region of the network device, a load status of the network device, or the first CTU resource, to hand over the terminal device to the network device.

According to this embodiment of the present disclosure, the handover request message includes information used to indicate that the terminal device supports grant-free transmission, the handover request acknowledgement message includes the information about the second CTU resource that the network device allows the terminal device to use, and the handover instruction message includes the information about the second CTU resource that the network device allows the terminal device to use.

According to this embodiment of the present disclosure, the processor 1210 determines, according to at least one of a load status of a contention access region of the network device or a load status of the network device, to hand over the terminal device to the network device.

According to this embodiment of the present disclosure, the information about the CTU resource includes information about at least one of a time-frequency resource, a code resource, or a pilot, CTU information, or the information about the contention access region.

For operations and functions of the network device 1200, refer to the method in FIG. 4. To avoid repetition, details are not described herein again.

Figure 13:
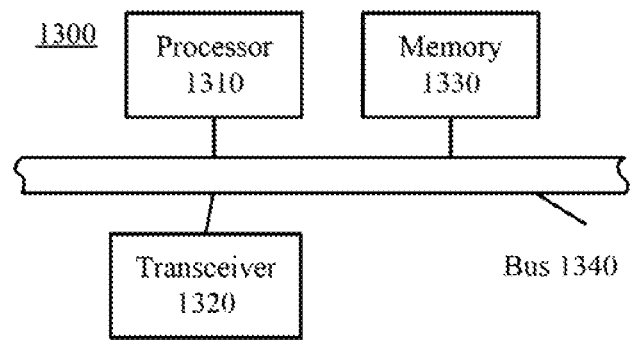
FIG. 13 is a schematic structural diagram of a terminal device according to another embodiment of the present disclosure.

FIG. 13 is a schematic structural diagram of a terminal device 1300 according to another embodiment of the present disclosure. The terminal device 1300 includes a processor 1310, a transceiver 1320, a memory 1330, and a bus 1340.

The transceiver 1320 is configured to receive a handover instruction message sent by a first network device. The handover instruction message is used to instruct to hand over the terminal device from the first network device to a second network device to perform grant-free transmission. The transceiver 1320 is further configured to transmit, according to the handover instruction message, a signal to the second network device on a contention transmission unit CTU resource in a grant-free transmission mode.

According to this embodiment of the present disclosure, after receiving a handover instruction sent by a first network device, a terminal device that performs grant-free transmission with the first network device transmits a signal to a second network device on a CTU in a grant-free transmission mode. In this way, a terminal device is handed over from a network device to another network device to perform grant-free transmission.

According to this embodiment of the present disclosure, the terminal device performs grant-free transmission using a first CTU resource before handover, and the handover instruction message includes information about a second CTU resource that the second network device allows the terminal device to use, so that the terminal device transmits the signal on the second contention transmission unit CTU resource in the grant-free transmission mode.

According to this embodiment of the present disclosure, the second CTU resource is the same as the first CTU resource if the second network device allows the terminal device to perform grant-free transmission using the first CTU resource; or the second CTU resource is different from the first CTU resource if the second network device forbids the terminal device to perform grant-free transmission using the first CTU resource.

Optionally, in another embodiment, the processor 1310 is configured to determine, according to the information about the second CTU resource carried in the handover instruction message, a CTU that is to be used in grant-free transmission performed after the terminal device is handed over to the second network device; the transceiver 1320 transmits the signal on the CTU in the grant-free transmission mode.

According to this embodiment of the present disclosure, the second CTU resource is a contention access region, and the processor 1310 determines a quantity of CTUs in the contention access region according to the information about the contention access region carried in the handover instruction message.

The processor 1310 determines the CTU according to the following formula:

$$\text{Indx}_{CTU} = \text{Sig}_i \bmod N_{CTU},$$

where $\text{Indx}_{CTU}$ is an index number of the CTU, mod represents a modulo operation, $N_{CTU}$ represents the quantity of the CTUs in the contention access region, and $\text{Sig}_i$ represents an index of a code resource of the terminal device.

According to this embodiment of the present disclosure, the information about the CTU resource includes information about at least one of a time-frequency resource, a code resource, or a pilot, CTU information, or the information about the contention access region.

For operations and functions of the terminal device 1300, refer to the method in FIG. 5. To avoid repetition, details are not described herein again.

A person of ordinary skill in the art may be aware that units and algorithm steps with reference to the examples described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for convenience and brevity of description, for detailed working processes of the foregoing system, apparatus, and unit, reference may be made to corresponding processes in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or may be integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on multiple network units. Some or all of the units may be selected according to actual needs, to achieve the objectives of the solutions in the embodiments.

In addition, function units in the embodiments of the present disclosure may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of the present disclosure. The foregoing storage medium includes any medium that can store program code, such as a USB flash drive, a removable hard disk, a read-only memory (ROM.), a random access memory (RAM), a magnetic disk, or an optical disc.

For brevity and clarity of the application, technical features and descriptions in an embodiment described above may be understood as being applicable to other embodiments, for example, technical features in the method embodiments may be applicable to the apparatus embodiments or other method embodiments, and details are not repeated in the other embodiments.

The sending module, sending unit, or transmitter in the foregoing embodiments may perform sending using an air interface, or may not perform sending using an air interface but send to another device so that the other device performs sending using an air interface. The receiving module, receiving unit, or receiver in the foregoing embodiments may perform receiving using an air interface, or may not perform receiving using an air interface but receive from another device that receives using an air interface.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A handover method for grant-free transmission, comprising:

receiving, by a terminal device from a first network device, a handover instruction message used to instruct a handover of the terminal device from the first network device to a second network device to perform grant-free transmission, wherein the terminal device performs grant-free transmission using a first contention transmission unit (CTU) resource before handover, the handover instruction message comprises information about a second contention transmission unit (CTU) resource allocated by the second network device for transmitting uplink data in a grant-free transmission mode, and information about the second CTU resource comprises information about a time-frequency resource and a pilot; and determining, by the terminal device according to the information about the second CTU resource carried in the handover instruction message, a quantity of CTUs in the contention access region and a CTU that is to be used in grant-free transmission performed after the terminal device is handed over to the second network device, wherein the CTU is determined according to the following formula:

$$\text{Indx}_{CTU} = \text{Sig}_i \bmod N_{CTU},$$

wherein $\text{Indx}_{CTU}$ is an index number of the CTU, mod represents a modulo operation, $N_{CTU}$ represents the quantity of the CTUs in the contention access region, and $\text{Sig}_i$ represents an index of a code resource of the terminal device; and transmitting, by the terminal device according to the handover instruction message, uplink data to the second network device on the second CTU resource in the grant-free transmission mode.

2. The handover method according to claim 1, wherein the second CTU resource is the same as the first CTU resource if when the second network device allows the terminal device to perform grant-free transmission using the first CTU resource; or the second CTU resource is different than the first CTU resource when the second network device forbids the terminal device to perform grant-free transmission using the first CTU resource.

3. A terminal device, comprising:

a transceiver, configured to:

receive a handover instruction message from a first network device, wherein the handover instruction message is used to instruct a handover of the terminal device from the first network device to a second network device to perform grant-free transmission, wherein the terminal device performs grant-free transmission using a first contention transmission unit (CTU) resource before handover, the handover instruction message comprises information about a second contention transmission unit (CTU) resource allocated by the second network device for transmitting uplink data in a grant-free transmission mode, and information about the second CTU resource comprises information about a time-frequency resource and a pilot; and a processor, coupled to the transceiver and configured to:

determine, by the terminal device according to the information about the second CTU resource carried in the handover instruction message, a quantity of CTUs in the contention access region and a CTU that is to be used in grant-free transmission performed after the terminal device is handed over to the second network device, wherein the CTU is determined according to the following formula:

$$\text{Indx}_{CTU} = \text{Sig}_i \bmod N_{CTU},$$

wherein $\text{Indx}_{CTU}$ is an index number of the CTU, mod represents a modulo operation, $N_{CTU}$ represents the quantity of the CTUs in the contention access region, and $Sig_i$ represents an index of a code resource of the terminal device; and the transceiver, configured to transmit, according to the handover instruction message, uplink data to the second network device on the second CTU resource in the grant-free transmission mode.

4. The terminal device according to claim 3, wherein the second CTU resource is the same as the first CTU resource when the second network device allows the terminal device to perform grant-free transmission using the first CTU resource; or the second CTU resource is different than the first CTU resource when the second network device forbids the terminal device to perform grant-free transmission using the first CTU resource.

5. A non-transitory computer readable medium, wherein the medium includes instructions for instructing a terminal device to perform a handover method for grant-free transmission, comprising:

receiving, by a terminal device, a handover instruction message from a first network device, wherein the handover instruction message is used to instruct a handover of the terminal device from the first network device to a second network device to perform grant-free transmission, wherein the terminal device performs grant-free transmission using a first contention transmission unit (CTU) resource before handover, the handover instruction message comprises information about a second contention transmission unit (CTU) resource which is allocated by the second network device for transmitting uplink data in a grant-free transmission mode, and information about the second CTU resource comprises information about a time-frequency resource and a pilot; and determining, by the terminal device according to the information about the second CTU resource carried in the handover instruction message, a quantity of CTUs in the contention access region and a CTU that is to be used in grant-free transmission performed after the terminal device is handed over to the second network device, wherein the CTU is determined according to the following formula:

$$Indx_{CTU} = Sig_i \bmod N_{CTU},$$

wherein $Indx_{CTU}$ is an index number of the CTU, mod represents a modulo operation, $N_{CTU}$ represents the quantity of the CTUs in the contention access region, and $Sig_i$ represents an index of a code resource of the terminal device; and transmitting, by the terminal device according to the handover instruction message, uplink data to the second network device on the CTU resource in the grant-free transmission mode.

6. The non-transitory computer readable medium according to claim 5, wherein the second CTU resource is the same as the first CTU resource when the second network device allows the terminal device to perform grant-free transmission using the first CTU resource; or the second CTU resource is different than the first CTU resource when the second network device forbids the terminal device to perform grant-free transmission using the first CTU resource.

* * * * *

UNITED STATES PATENT AND TRADEMARK OFFICE
CERTIFICATE OF CORRECTION

PATENT NO. : 10,412,637 B2
APPLICATION NO. : 15/852903
DATED : September 10, 2019
INVENTOR(S) : Rongdao Yu Page 1 of 1

It is certified that error appears in the above-identified patent and that said Letters Patent is hereby corrected as shown below:

In the Claims

Column 36, Line 32 (approx.):
In Claim 2, after "resource" delete "if".

Signed and Sealed this
Thirty-first Day of December, 2019

Andrei Iancu
*Director of the United States Patent and Trademark Office*